(12) United States Patent
Naito et al.

(10) Patent No.: US 11,634,617 B2
(45) Date of Patent: Apr. 25, 2023

(54) ADHESIVE COMPOSITION, A PROCESS OF PRODUCING THE ADHESIVE COMPOSITION, A BONDING METHOD USING THE ADHESIVE COMPOSITION, AND A STRUCTURE HAVING THE ADHESIVE COMPOSITION APPLIED THEREON

(71) Applicant: NATIONAL INSTITUTE FOR MATERIALS SCIENCE, Tsukuba (JP)

(72) Inventors: Masanobu Naito, Tsukuba (JP); Sandip Das, Tsukuba (JP); Debabrata Payra, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 941 days.

(21) Appl. No.: 16/478,369

(22) PCT Filed: Dec. 20, 2017

(86) PCT No.: PCT/JP2017/045712
§ 371 (c)(1),
(2) Date: Jul. 16, 2019

(87) PCT Pub. No.: WO2018/142793
PCT Pub. Date: Aug. 9, 2018

(65) Prior Publication Data
US 2020/0190378 A1     Jun. 18, 2020

(30) Foreign Application Priority Data

Jan. 31, 2017   (JP) .............................. JP2017-016323
Oct. 11, 2017   (JP) .............................. JP2017-197389

(51) Int. Cl.
| C09J 199/00 | (2006.01) |
| C09J 7/35 | (2018.01) |
| C08G 18/73 | (2006.01) |
| C08G 18/75 | (2006.01) |
| C08G 18/76 | (2006.01) |
| C08K 3/013 | (2018.01) |
| C08K 3/08 | (2006.01) |
| C08K 3/26 | (2006.01) |
| C08K 5/1515 | (2006.01) |
| C08K 5/1535 | (2006.01) |
| C08K 7/14 | (2006.01) |

(52) U.S. Cl.
CPC ............ *C09J 199/00* (2013.01); *C08G 18/73* (2013.01); *C08G 18/755* (2013.01); *C08G 18/7657* (2013.01); *C09J 7/35* (2018.01); *C08K 3/013* (2018.01); *C08K 3/08* (2013.01); *C08K 3/26* (2013.01); *C08K 5/1515* (2013.01); *C08K 5/1535* (2013.01); *C08K 7/14* (2013.01); *C08K 2003/0806* (2013.01); *C08K 2003/265* (2013.01); *C08K 2201/001* (2013.01); *C08K 2201/005* (2013.01)

(58) Field of Classification Search
None
See application file for complete search history.

(56) References Cited

U.S. PATENT DOCUMENTS

| 2010/0255315 | A1* | 10/2010 | Okabe ................ C08G 59/5033 75/401 |
| 2015/0184039 | A1* | 7/2015 | Lutz ..................... C08G 59/56 525/65 |
| 2017/0321061 | A1 | 11/2017 | Naito et al. |
| 2018/0171059 | A1* | 6/2018 | Schmatloch ............... C09J 5/06 |

FOREIGN PATENT DOCUMENTS

| JP | H08-092540 A | 4/1996 |
| JP | 2004-307362 A | 11/2004 |
| JP | 2010-043236 A | 2/2010 |
| JP | 2010-254821 A | 11/2010 |
| JP | 2011-116930 A | 6/2011 |
| WO | 2016/076311 A1 | 5/2016 |

OTHER PUBLICATIONS

Machine Translation of Nomura et al. JP 2004 307362 (Year: 2004).*
PCT/ISA/210, "International Search Report for International Application No. PCT/JP2017/045712," dated Feb. 20, 2018.

(Continued)

*Primary Examiner* — Robert T Butcher
(74) *Attorney, Agent, or Firm* — Manabu Kanesaka

(57) ABSTRACT

The present invention has for its object to provide an adhesive composition that is based on a naturally occurring material less likely to have adverse influences on the human body and has a tensile shear strength (adhesive strength) of at least 1 MPa with respect to a variety of adherends. The present invention provides an adhesive composition including at least a first pack and a second pack, wherein the first pack contains a tannic acid derivative in which a hydrogen atom in at least some hydroxyl group of tannic acid is substituted by a chain hydrocarbon group having at least one hydroxyl group, and the second pack contains a hydrocarbon having at least two cyanate groups or a derivative of the hydrocarbon.

20 Claims, 14 Drawing Sheets

(56) References Cited

OTHER PUBLICATIONS

C. Aouf et al., "Multi-functionalization of gallic acid. Synthesis of a novel bio-based epoxy resin," European Polymer Journal, 2013, p. 1185-1195, vol. 49.
K. Kim et al., "TAPE: A Medical Adhesive Inspired by a Ubiquitous Compound in Plants," Advanced Functional Materials, 2015, p. 2402-2410, vol. 25.
M. Shin et al., "Tannic Acid as a Degradable Mucoadhesive Compound," ACS Biomaterials Science & Engineering, 2016, p. 687-696, vol. 2.
H. J. Meredith et al., "Enhancing the Adhesion of a Biomimetic Polymer Yields Performance Rivaling Commercial Glues," Advanced Functional Materials, 2014, p. 3259-3267, vol. 24.

\* cited by examiner

Substrate: Glass

| | No Peeling Test | Ten Peeling Test |
|---|---|---|
| Tannic Acid TA |  |  |
| Tannic Acid derivative T5 |  |  |

US 11,634,617 B2

ADHESIVE COMPOSITION, A PROCESS OF PRODUCING THE ADHESIVE COMPOSITION, A BONDING METHOD USING THE ADHESIVE COMPOSITION, AND A STRUCTURE HAVING THE ADHESIVE COMPOSITION APPLIED THEREON

RELATED APPLICATIONS

The present application is National Phase of International Application No. PCT/JP2017/045712 filed Dec. 20, 2017, and claims priority from Japanese Applications No. 2017-016323, filed Jan. 31, 2017, and No. 2017-197389, filed Oct. 11, 2017, the disclosure of which is hereby incorporated by reference herein in its entirety.

FIELD OF THE INVENTION

The present invention relates to an adhesive composition, a process of producing the adhesive composition, a bonding method using the adhesive composition, and a structure having the adhesive composition applied thereon.

DESCRIPTION OF THE PRIOR ART

A variety of currently available adhesives include those based on epoxy, acryl, cyanoacrylate, synthetic rubber and vinyl chloride, urethane resin-based adhesives, fibrin adhesives, among which the synthetic type has various problems, as already indicated. For instance, the epoxy-based adhesives are widely used because of having a strong adhesive force in spite of their relative inexpensiveness; however, they give rise to health problems.

Most of industrially used epoxy resins are synthesized from bis-phenol A (4-4'-(propan-2,2-diyl)diphenol, BPA for short). According to the 2009 data, BPA is produced on global scales in amounts of as large as 2,200,000 tons per year; however, some restriction is now imposed on its use in a major power inclusive of America due to possible adverse influences on the health of human beings and aquatic life (see Non-Patent Publication 1).

With such circumstances in mind, adhesives based on naturally occurring materials considered less likely to have adverse influences on the human body are now under development, and there is one attempt to use a mixture of tannic acid (hereinafter TA for short) with polyethylene glycol (PEG), named TAPE, as a medical adhesive. TAPE takes advantage of the noncovalent bonds of TA and PEG, and has a strong-enough adhesive force of 1 kPa up to 20 kPa provided that it is used for medical purposes alone (see Non-Patent Publication 3).

PRIOR ARTS

Patent Publications

Patent Publication 1: JP(A) 8-92540
Non-Patent Publication 1: European Polymer Journal, vol. 49, pp. 1185-1195 (2013)
Non-Patent Publication 2: Adv. Funct. Mater, vol. 25, pp. 2402-2410 (2015)
Non-Patent Publication 3: ACS Biomater. Sci. Eng., vol. 2, pp. 687-696 (2016)
Non-Patent Publication 4: Adv. Funct. Mater, vol. 24, pp. 3259-3267 (2014)

SUMMARY OF THE INVENTION

Objects of the Invention

While the adhesive formed of a TA/PEG mixture has a relatively high adhesive force when used in medical applications, it has a poor adhesive force when used as a general-purpose adhesive for metals, woods, glasses, steel sheets or the like. A typical measure of the adhesive force used in general-purpose applications is a tensile shear strength of at least 1 MPa as set forth in Non-Patent Publication 4 as an example. Note here that the "tensile shear strength" refers to the strength of an adhesive.

An object of the present invention is to provide a solution to the above-mentioned problem by the provision of an adhesive composition that is produced on the basis of a naturally occurring material less likely to have adverse influences on health with a strong tensile shear strength of at least 1 MPa relative to a variety of adherends such as metals, woods and glasses.

ASPECTS OF THE INVENTION

Set out below are the aspects of the invention.
(Aspect 1)
An adhesive composition comprising at least a first pack and a second pack, wherein:
the first pack contains a tannic acid derivative in which a hydrogen atom in at least some hydroxyl group of tannic acid is substituted by a chain hydrocarbon group having at least one hydroxyl group, and
the second pack contains a hydrocarbon having at least two cyanate groups or a derivative of the hydrocarbon.
(Aspect 2)
The adhesive composition according to aspect 1, wherein the chain hydrocarbon group is derived from a compound having an epoxy group comprising a three-membered ring.
(Aspect 3)
The adhesive composition according to aspect 2, wherein the compound having an epoxy group is one or more selected from the group consisting of propylene oxide, 1,2-epoxyhexane, 1,2-epoxyoctane, 1,2-epoxydecane, epibromohydrin, epichlorohydrin, epifluorohydrin, and epiiodohydrin.
(Aspect 4)
The adhesive composition according to any one of aspects 1 to 3, wherein the substituted chain hydrocarbon group in the tannic acid derivative is grafted by a constitutional unit which results from ring-opening polymerization of a compound having a furan ring.
(Aspect 5)
The adhesive composition according to aspect 4, wherein the compound having a furan ring is tetrahydro-furan or 2-methyltetrahydrofuran.
(Aspect 6)
The adhesive composition according to any one of aspects 1 to 5, wherein a molar ratio between the tannic acid and the chain hydrocarbon group is no less than 1:1 to no greater than 1:50.
(Aspect 7)
The adhesive composition according to any one of aspects 1 to 6, wherein the number of carbons in the hydrocarbon or hydrocarbon derivative in the second pack is no less than 2 to no greater than 64.
(Aspect 8)
The adhesive composition according to any one of aspects 1 to 6, wherein the second pack is one or more selected from the group consisting of hexamethylene diisocyanate, tetramethylene diisocyanate, diphenyl-methane diisocyanate, and isophorone diisocyanate.

(Aspect 9)

The adhesive composition according to any one of aspects 1 to 8, wherein in the tannic acid derivative, a hydrogen atom in some hydroxyl group positioned in a terminal aromatic ring of the tannic acid is substituted by the chain hydrocarbon group.

(Aspect 10)

The adhesive composition according to any one of aspects 1 to 9, comprising the first pack, the second pack, and a filler.

(Aspect 11)

A process of producing an adhesive composition including at least a first pack and a second pack, comprising:

a step of providing tannic acid and a chain hydrocarbon having an epoxy group;

a step of producing the first pack by mixing together the tannic acid and the chain hydrocarbon having an epoxy group in a solvent containing a compound having a furan ring to react the tannic acid with the chain hydrocarbon having an epoxy group thereby forming a tannic acid derivative in which a hydrogen atom in at least some hydroxyl group of the tannic acid is substituted by a chain hydrocarbon group having at least one hydroxyl group; and a step of providing the second pack containing a hydrocarbon having two or more cyanate groups or a derivative of the hydrocarbon.

(Aspect 12)

The process of producing an adhesive composition according to aspect 11, wherein the chain hydrocarbon having an epoxy group is a compound having an epoxy group comprising a three-membered ring.

(Aspect 13)

The process of producing an adhesive composition according to aspect 11 or 12, wherein in the chain hydrocarbon having an epoxy group, the number of carbons in the chain hydrocarbon group bonded to the epoxy group is no less than 1 to no greater than 8.

(Aspect 14)

The process of producing an adhesive composition according to aspect 12 or 13, wherein the compound having an epoxy group comprising a three-membered ring is one or more selected from the group consisting of propylene oxide, 1,2-epoxyhexane, 1,2-epoxyoctane, 1,2-epoxydecane, epibromohydrin, epichlorohydrin, epifluorohydrin, and epiiodohydrin.

(Aspect 15)

The process of producing an adhesive composition according to any one of aspects 11 to 14, wherein the compound having a furan ring is tetrahydrofuran or 2-methyltetrahydrofuran.

(Aspect 16)

The process of producing an adhesive composition according to any one of aspects 11 to 15, wherein a molar ratio between the tannic acid and the chain hydrocarbon group having at least one hydroxyl group is no less than 1:1 to no greater than 1:50.

(Aspect 17)

The process of producing an adhesive composition according to aspect 11, wherein the hydrocarbon having at least two cyanate groups or the hydrocarbon derivative is one or more selected from the group consisting of hexamethylene diisocyanate, tetramethylene diisocyanate, diphenylmethane diisocyanate, and isophorone diisocyanate.

(Aspect 18)

A bonding method including:

a step of preparing a liquid mixture by mixing the first and second packs of the adhesive composition according to any one of aspects 1 to 10 together with a solvent, a step of applying the liquid mixture to an adherend, and a step of carrying out heat treatment, wherein an amount of the second pack is no less than 5% by weight to no greater than 50% by weight relative to a total weight of the first and second packs.

(Aspect 19)

The bonding method according to aspect 18, wherein the amount of the second pack is no less than 30% by weight to no greater than 40% by weight relative to a total weight of the first and second packs.

(Aspect 20)

The bonding method according to aspect 18 or 19, wherein the heat treatment is carried out at a temperature of no lower than 23° C. to no higher than 200° C.

(Aspect 21)

The bonding method according to aspect 18 or 19, wherein the heat treatment is carried out at a temperature of no lower than 23° C. to no higher than 150° C.

(Aspect 22)

The bonding method according to aspect 18 or 19, wherein the heat treatment is carried out at a temperature of no lower than 80° C. to no higher than 150° C.

(Aspect 23)

The bonding method according to any one of aspects 18 to 22, wherein the heat treatment is carried out for a time period of no less than 15 minutes to no longer than 60 minutes.

(Aspect 24)

The bonding method according to any one of aspects 18 to 22, wherein the heat treatment is carried out for a time period of no less than 45 minutes to no longer than 60 minutes.

(Aspect 25)

A structure, wherein a mixture of the first and second packs of the adhesive composition according to any one of aspects 1 to 10 is applied to at least a portion of an exposed surface thereof.

ADVANTAGES OF THE INVENTION

According to the present invention, it is possible to provide a two-pack adhesive composition that is based on a naturally occurring material less likely to have any adverse influence on the human body and has a necessary and sufficient adhesive force relative to general-purpose adherends such as metals, woods and glasses and a process of producing that adhesive composition. It is also possible to provide a structure including an exposed surface having bactericidal, sterilizing and harmful gas-adsorbing actions.

MODES FOR CARRYING OUT THE INVENTION

Adhesive Composition

Figure 1:
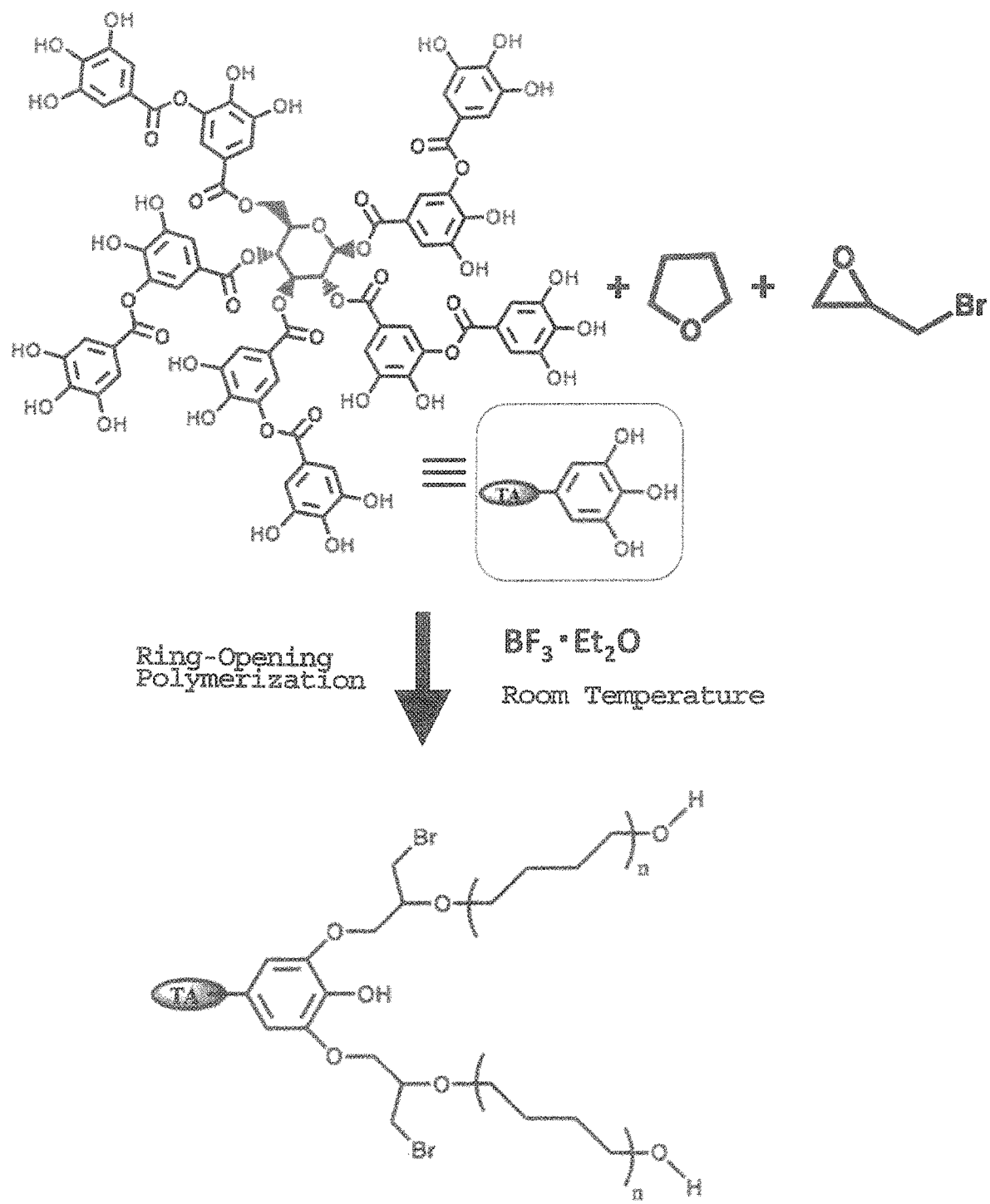
FIG. 1 is a chemical reaction process diagram for the first pack according to the present invention.

The adhesive composition of the invention is a two-pack adhesive composition containing a first pack and a second pack. Note here that the first pack contains a tannic acid derivative in which a hydrogen atom in at least some hydroxyl group of tannic acid is substituted by a chain hydrocarbon group having at least one hydroxyl group, and the second pack contains a hydrocarbon having at least two cyanate groups or a derivative of the hydrocarbon.

Tannins are a comprehensive term for plant components that yield polyvalent phenols by way of hydrolysis, and generally broken down into hydrolysable tannin in which gallic acid or ellagic acid is ester bonded to glucose or the like and which is susceptible of hydrolysis with acids or enzymes, and condensed tannin in which a compound having a flavanol skeleton is polymerized. Even with either one of tannins or their mixtures, it may be possible to prepare (derivatize) the tannic acid derivatives considered to have the advantages of the invention. The hydrolysable tannin is preferred; for instance, products containing as a main component a tannic acid (often referred to as TA for short) expressed by the following formula (A1) are derivatized.

Chemical Formula 1

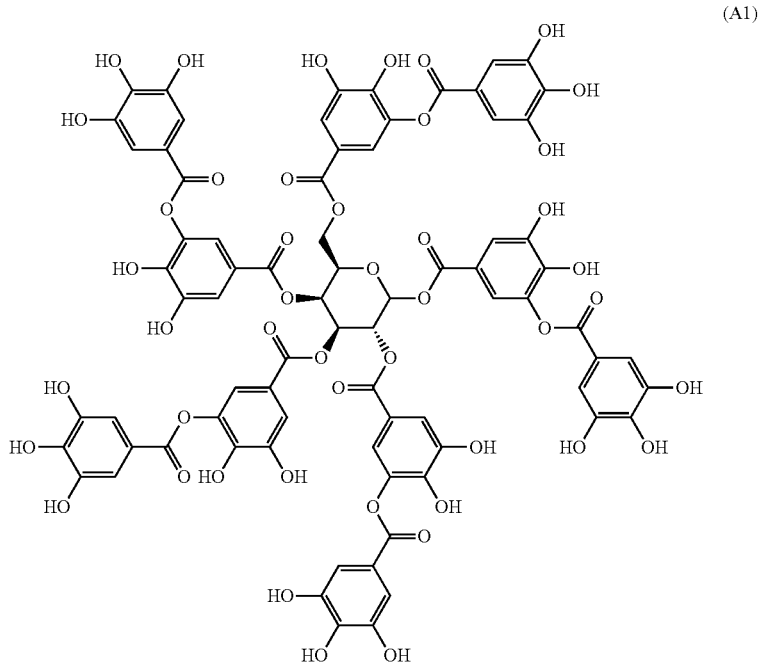

(A1)

The substituent by which a hydrogen atom in at least some hydroxyl group of tannic acid is substituted may be a chain hydrocarbon group having at least one hydroxyl group. The preferably used chain hydrocarbon group is derived from a chain hydrocarbon subjected to ring-opening polymerization in a solvent including a compound having a furan ring such as a tetrahydrofuran (THF) having the following formula (A2) or 2-methyltetrahydrofuran having the following formula (A3); for instance, a chain hydrocarbon including an epoxy group, and especially a compound including an epoxy group comprising a three-membered ring. In terms of ease of synthesis operation, the number of carbons in the chain hydrocarbon group bonded to an epoxy group is preferably no less than 1 to no greater than 8. For instance, there is the mention of the compounds represented by the following formulae (A4) to (A11). Note here that A4 stands for propylene oxide, A5 for 1,2-epoxyhexane, A6 for 1,2-epoxyoctane, A7 for 1,2-epoxydecane, A8 for epibromohydrin (EPBH), A9 for epichlorohydrin (EPCH), A10 for epifluorohydrin (EPFH), and A11 for epiiodohydrin (EPIH).

Chemical Formula 2

(A2)

Chemical Formula 3

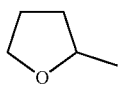

(A3)

Chemical Formula 4

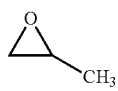

(A4)

Chemical Formula 5

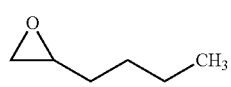

(A5)

Chemical Formula 6

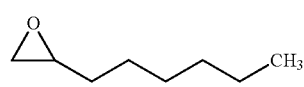

(A6)

Chemical Formula 7

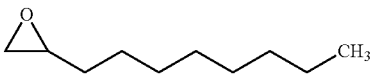

(A7)

Chemical Formula 8

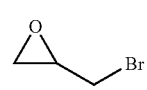

(A8)

Chemical Formula 9

(A9)

Chemical Formula 10

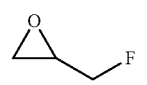

(A10)

Chemical Formula 11

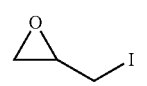

(A11)

The molar ratio between tannic acid and the chain hydrocarbon group is preferably no less than 1:1 (i.e., one or more chain hydrocarbon groups per TA1) to no greater than 1:50, and more preferably no less than 1:15 to no greater than 1:20. At a molar ratio of no less than 1:1, there is an adhesive force manifesting itself, and at a molar ratio of no less than 1:15 to no greater than 1:20, there is the adhesive force getting much stronger. At a molar ratio of greater than 1:50, on the other hand, there may likely a problem arising: fluidization takes place, resulting in no manifestation of any adhesive force.

The following formula (A12) stands for one example of the tannic acid derivative substituted by the chain hydrocarbon group. As will be described later, if ring-opening polymerization reaction is carried out using a compound having a furan ring such as THF or 2-methyltetrahydrofuran as at least one of solvents, there will then be a tannic acid derivative synthesized in which the hydrogen of the terminal hydroxyl group of tannic acid is substituted.

Chemical Formula 12

(A12)

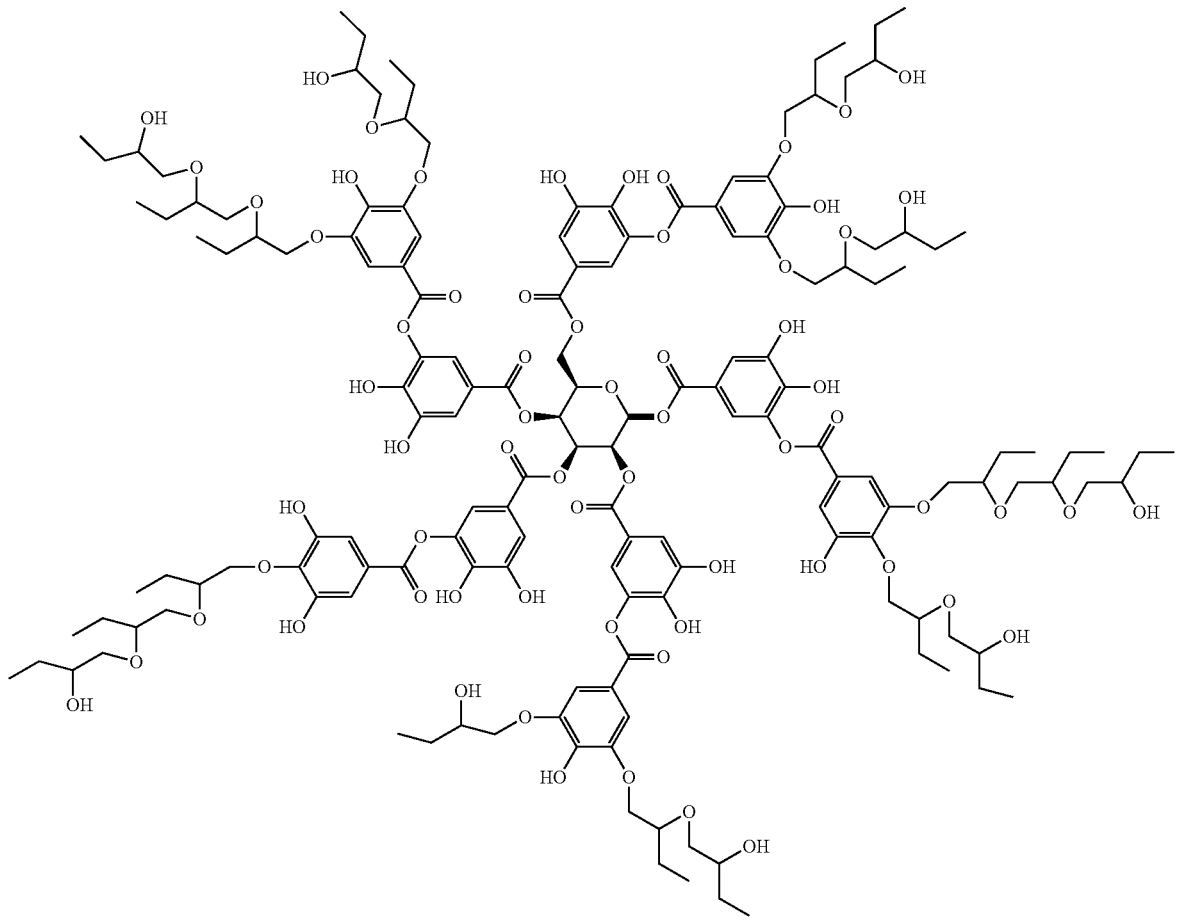

The second pack contains a hydrocarbon having at least two cyanate groups or its derivative, preferably a linear or chain hydrocarbon or hydrocarbon derivative having at least two cyanate groups. Note here that the number of carbons in the hydrocarbon or hydrocarbon derivative is no less than 2 to no greater than 64, preferably no less than 2 to no greater than 5. If the number of carbons is within the above-mentioned range, there is then an effect obtained: an increase in the adhesive strength after the reaction. The hydrocarbon having at least 2 cyanate groups or its derivative may typically be a compound represented by the following formulae (A13) to (A16). Note here that A13 stands for hexamethylene diisocyanate (HDI), A14 for tetramethylene diisocyanate (TDI), A15 for diphenylmethane diisocyanate, and A16 for isophorone diisocyanate.

Chemical Formula 13

(A13)

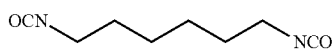

Chemical Formula 14

(A14)

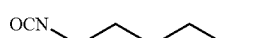

Chemical Formula 15

(A15)

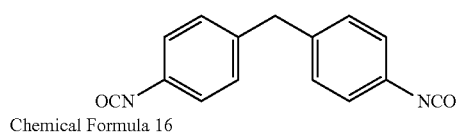

Chemical Formula 16

(A16)

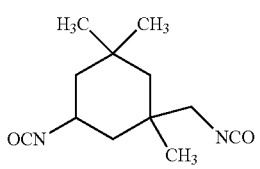

The first and second packs are respectively dissolved in a solvent to obtain a two-pack adhesive. Note here that while the solvents used for the first and second packs are not necessarily be the same, they should preferably be the same because of good compatibility and identical volatility. Although THF is preferable for the solvents, other solvents such as dimethylformamide or alcohols may be used. Further, there may be a mixed solvent used in which those solvents are mixed together. Such a mixed solvent is characterized in that it is easy to adjust its volatilization speed to a given value. On the other hand, the use of the single solvent is characterized in that management becomes easy upon production.

In addition to the first and second packs, the adhesive composition may further contain a filler thereby making the adhesive strength stronger. Note here that the filler may include calcium carbonate ($CaCO_3$), glass fibers, cellulose fibers, and an electrically conductive filler such as silver. By way of example but not by way of limitation, the size of the filler is preferably no less than 1 μm to no greater than 100 μm. The amount of the filler to be added is preferably no less than 10% by weight to no greater than 50% by weight per the total weight of the first and second packs for the purpose of increasing the adhesive strength. In an amount of greater than 80% by weight, on the other hand, the adhesive force may possibly go down considerably.

How to Produce the Adhesive Composition

The tannic acid derivative that is the first pack of the invention may be produced by stirring and mixing tannic acid (TA) with the above-mentioned chain hydrocarbon containing an epoxy group such as EPBH in a THF solvent, causing a ring-opening polymerization reaction to take place with Lewis acid as a catalyst (see FIG. 1). For instance, the Lewis acid used may be a boron trifluoride/diethyl ether complex ($BF_3 \cdot Et_2O$). The reaction time is preferably no less than 6 hours to no greater than 18 hours, typically 18 hours. For less than 6 hours, the reaction may possibly fail to proceed well, resulting in lower yields, and for longer than 18 hours, the reaction may be saturated, resulting in a time loss.

The thus produced tannic acid derivative has a structure wherein the hydrogen in the hydroxyl group of the terminal region of tannic acid is substituted by the chain hydrocarbon. This substitution is often associated with graft reactions attributable to a reactivity difference between the chain hydrocarbon containing an epoxy group and the THF solvent while the chain hydrocarbon group derived from EPBH or the like and having at least one hydroxyl group acts as an initiator. This graft chain is mainly composed of polytetrahydrofuran (poly-THF) (see FIG. 1). Thus, THF plays an important role not only as a solvent but also as what forms part of the tannic acid derivative. This is confirmed by way of NMR (Nuclear Magnetic Resonance), as described in a production example.

The hydrocarbon having two or more cyanate groups or its derivative that is the second pack of the invention, and the solvent may be commercially available. For instance, commercially available HDI and THF may be used as the second pack and solvent, respectively.

Bonding Method

According to the bonding method disclosed herein, the first and second packs are fully mixed together with the solvent to prepare a liquid mixture. Then, the liquid mixture is applied on adherends as by coating, after which they are brought in close contact with each other and heat treated for bonding. Note here that in view of making the adhesive force stronger, the second pack is provided for mixing in an amount of no less than 5% by weight to no greater than 50% by weight, preferably no less than 25% by weight to no greater than 45% by weight, and more preferably no less than 30% by weight to no greater than 40% by weight per the total weight of the first and second packs.

The heat treatment is carried out at temperatures of preferably no less than 23° C. to no greater than 200° C., more preferably no less than 23° C. to no greater than 150° C., and most preferably no less than 80° C. to no greater than 150° C. Even at temperatures of lower than 23° C., the polymerization reaction between the first pack: tannic acid derivative and the second pack: the hydrocarbon having two or more cyanate groups or its derivative may proceed to bring about an adhesive force in the resulting polymer film, but its bonding speed is badly slow and, hence, not preferable in view of bonding efficiency. At temperatures of greater than 80° C., the adhesive force becomes especially strong. At temperatures of greater than 200° C., on the other hand, the above-mentioned polymer film is likely to break down thermally. This thermal decomposition can start from a temperature of greater than 150° C.; so the heat treatment temperature is preferably set at no greater than 150° C.

The heat treatment time is preferably no shorter than 30 minutes to no longer than 60 minutes at the heat treatment temperature of 80° C. In shorter than 30 minutes, the polymerization reaction proceeds only insufficiently, sometimes resulting in poor adhesive force, and in longer than 60 minutes, the polymerization reaction is saturated ending up with time losses.

The adhesive force would appear to result from the hydrogen bond by the hydroxyl group of the tannic acid derivative, and the polymerization (covalent bonding) of the tannic acid derivative and the hydrocarbon having two or more cyanate groups and being rich in flexibility.

It is to be noted that among methods of enhancing the adhesive force without any heat treatment, there is also a method making use of catalysts such as dibutyltin dilaurate. With this method, the adhesive force is enhanced by way of the formation of urethane bonds, as is the case with the above-mentioned heat treatment.

Application

Figure 2:
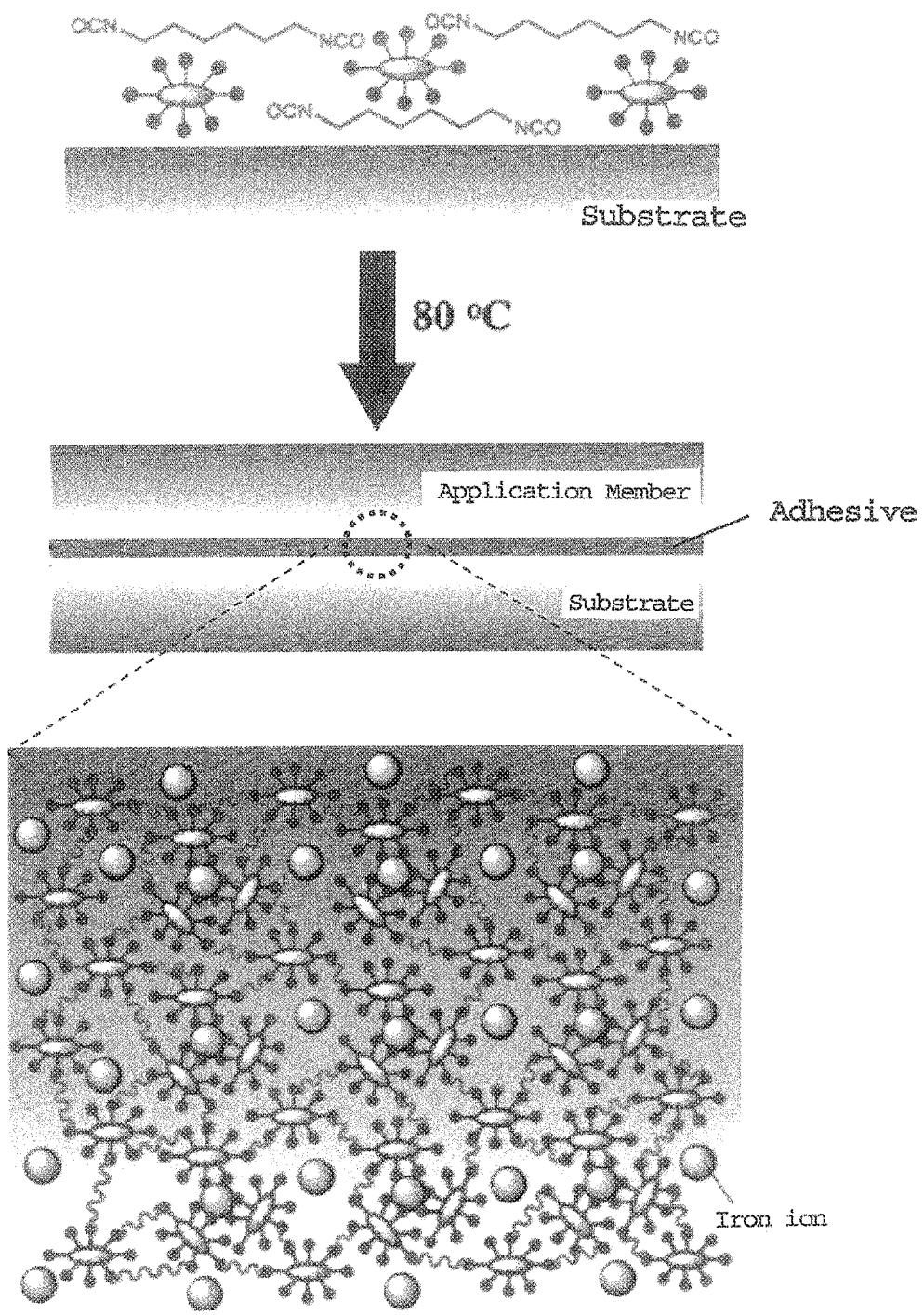
FIG. 2 is a schematic view of the bonding mechanism taking part in bonding to SUS.

The adhesive composition of the invention lends itself to the bonding of a variety of members such as metal/metal, wood/wood, glass/glass, metal/glass, metal/wood and wood/glass, and has a strong adhesive force relative to SUS in particular. This would appear to be due to, in addition to the polymerization of the film, the occurrence of hydrogen bonding to metal oxides and coordinate bonding of the polyphenol forming the tannic acid derivative to metal ions in general, and iron ions in particular (see FIG. 2).

Tannic acid has a rust-preventive action, so when the adhesive composition of the invention is applied to a metal, the metal surface having the adhesive applied thereon is less susceptible to rust and degradation by corrosion, making sure bonding that is enhanced in terms of stability with time.

To add to this, tannic acid has an anticorrosion action on woods by way of its antibacterial action. For this reason, even when the adhesive composition of the invention is applied to a wood, the bonded surface is less susceptible to degradation by corrosion, making sure bonding that is enhanced in terms of stability with time.

Thus, when two or more substrates formed of materials such as woods having at least one surface susceptible to bacterial corrosion or easy-to-get rusty metals are bonded together by use of the adhesive composition of the invention, a structure formed of those substrates is so resistant to bacteria or rust that it is stabilized with the elapse of time.

It is also understood that the application of the adhesive composition of the invention is not limited to adhesives. If the liquid mixture of the first and second packs—the ingredients of the adhesive composition according to the invention—is applied to at least one portion of the surface of a substrate comprising a material susceptible to corrosion by bacteria or metal to form a polymer film, it is then possible to protect the substrate against corrosion by bacteria. Likewise, if the first and second packs—the ingredients of the adhesive composition according to the invention—are mixed together and then applied to at least an area of the exposed portion of a structure, it is then possible to give bactericidal/sterilizing actions and corrosion resistance to the applied portion of the structure. It is thus possible to give bactericidal/sterilizing actions and corrosion resistance to that structure.

The polymer film formed by mixing together the first and second packs that are the ingredients of the adhesive composition according to the invention has a function of adsorbing harmful gases such as ammonia gas, amine compounds, aldehyde compounds and thiol compounds.

For this reason, if the first and second packs—the ingredients of the adhesive composition according to the invention—are mixed together and then applied to at least an area of the exposed portion of a structure, for instance, a wall surface portion, it then converts that structure to a functional structure capable of adsorbing harmful gases thereby making the cleanness of the atmosphere.

In addition, the risk of releasing harmful gases off the adhesive of the invention is relatively held back.

EXAMPLES

Exemplary Production (Preparation)

In what follows, how to produce the adhesive composition of the invention and the structural analysis of the obtained product will be described.

The tannic acid derivative was prepared as the first pack using tannic acid (TA), epibromohydrin (EPBH), tetrahydrofuran (THF) also acting as a solvent and a boron trifluoride/diethyl ether complex ($BF_3 \cdot Et_2O$) as a catalyst. Note here that TA and $BF_3 \cdot Et_2O$ were obtained from Wako Pure Chemical Industries, Ltd., and that EPBH was obtained from Tokyo Chemical Industry Co., Ltd.

As shown in FIG. 1, TA and EPBH were first mixed together in the solvent THF, to which the catalyst $BF_3 \cdot Et_2O$ was then added for ring-opening polymerization reaction at room temperature. As set out in Table 1, the amount of TA was 1.16 mmol; the amount of THF was 245 mmol; and EPBH was used in six amounts between 0 mmol and 34.8 mmol (30 eq. relative to TA). $BF_3 \cdot Et_2O$ was added to EPBH in an amount of 0.7 mol %. The thus obtained six tannic acid derivatives were called T1 at the time when the amount of EPBH was 0 mmol (0 eq. relative to TA), T2 when it was 5 eq., T3 when it was 10 eq., T4 when it was 15 eq., T5 when it was 20 eq., and T6 when it was 30 eq., respectively.

TABLE 1

| Name | Tannic Acid (TA) | Epibromohydrin (EPBH) | Tetrahydrofuran (THF) |
|---|---|---|---|
| T1 | 1.16 mmol | 0 mmol; 0 eq. | 245 mmol |
| T2 | 1.16 mmol | 5.8 mmol; 5 eq. | 245 mmol |
| T3 | 1.16 mmol | 11.6 mmol; 10 eq. | 245 mmol |
| T4 | 1.16 mmol | 17.4 mmol; 15 eq. | 245 mmol |
| T5 | 1.16 mmol | 23.2 mmol; 20 eq. | 245 mmol |
| T6 | 1.16 mmol | 34.8 mmol; 30 eq. | 245 mmol |

How to prepare the tannic acid derivatives T1 to T6 is now described in further details.

First, 1.16 mmol (2 grams) of TA were weighed and put in a two-neck round bottom flask equipped with a water-cooling mechanism under an argon gas purge. An argon gas was filled in that flask twice, to which 245 mmol (20 ml) of THF were then added, and the flask was rotated for 30-minutes stirring.

Thereafter, an injector was used to add the above-mentioned given amount of EPBH, followed by further addition as a catalyst of $BF_3 \cdot Et_2O$ in an amount of 0.7 mol % relative to the epibromohydrin used. The flask was rotated at room temperature (23° C.) for 18 hours while stirring was carried out for reaction.

Thereafter, a rotary pump was put in operation to take out a brown liquid while volatile components were removed, and a sufficient amount of pure water was used for precipitation of that brown component. This precipitation was repeated several times with a sufficient amount of pure water for removal of unreacted TA and EPBH as well as $BF_3 \cdot Et_2O$ used as the catalyst. Subsequently, drying was carried out at 60° C. in vacuum for 3 hours, and the reaction product was left overnight at room temperature (23° C.) to prepare tannic acid derivative T1 to T6.

Then, the structures of TA and the thus prepared tannic acid derivatives T1 to T6 were analyzed by means of $^1$HNMR.

The $^1$H spectra of each sample were measured in a 25° C. DMSO-d (dimethyl sulfoxide-deuterium) solution using JNM-ECX300 (JEOL). Note here that DMSO-d contains 1% TMS (tetramethylsilane), and that the chemical shift values were measured and given in terms of ppm with TMS as a reference.

Figure 3:
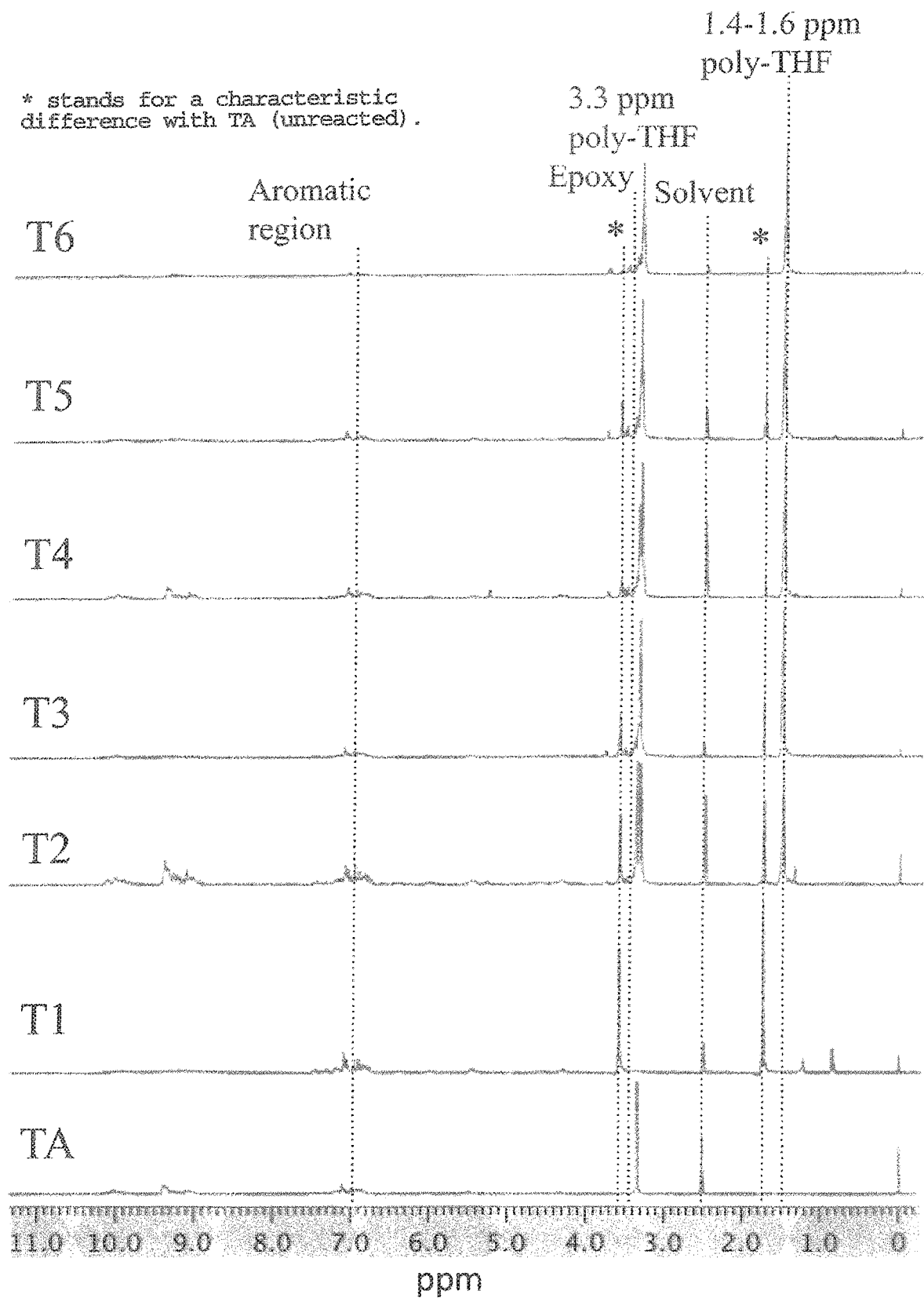
FIG. 3 is indicative of the $^1$H NMR spectra of tannic acid and its derivative used in one production example of the invention.

As can be seen from FIG. 3 indicative of the results:
(1) in every sample, there are a plurality of broad peaks found in a 6.7 ppm to 7.5 ppm region corresponding to the protons of an aromatic ring;
(2) in a 3.4 ppm to 4.0 ppm region indicative of a graft growth taking place with an epoxy on TA as an initiator, T2 to T6 have a plurality of broad peaks, but TA and T1 have not;
(3) peaks in a 1.4 ppm to 1.6 ppm region are found in T2 to T6, but they are not found in T1 and TA that do not contain EPBH or are free from any epoxy group. Peaks in a 1.4 ppm to 1.6 ppm region are due to the methylene proton (—O—$CH_2$—$CH_2$—$CH_2$—$CH_2$—O—) of poly-THF, which would appear to mean that the epoxy group of EPBH acts as the initiation group of this graft reaction; and
(4) at 1.76 ppm and 3.6 ppm, peaks are found in T1 to T6, but they are not in TA. Such peaks would appear to mean that THF remains unreacted and locked onto these materials.

Then, TA and the prepared tannic acid derivatives T1 to T5 were analyzed with the use of FTIR (Fourier Transform Infrared Spectroscopy). FT-IR6100 (JASCO Corporation) was used as the measuring equipment, and samples were measured in the form of KBr pallets.

Figure 4:
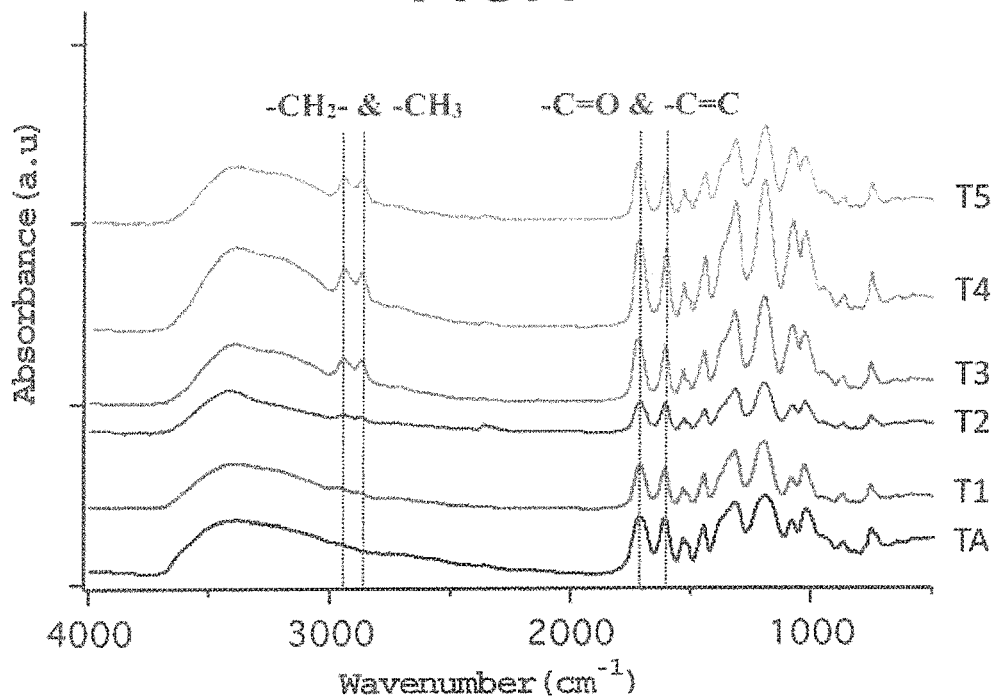
FIG. 4 is indicative of the FTIR spectra of tannic acid and its derivative used in one production example of the invention.

As can be seen from FIG. 4 indicative of the results:
(1) over a 3000 $cm^{-1}$ to 3600 $cm^{-1}$ region, a broad absorption band considered to be due to the O—H stretch of polyphenol is found in all samples TA and T1 to T5;
(2) over a 2800 $cm^{-1}$ to 3000 $cm^{-1}$ region, a significant absorption considered to be due to the —$CH_3$— and —$CH_2$— stretches is found in the TA derivative samples T2 to T5. The amount of this absorption becomes large in samples T3 to T5 in particular, in which samples the amount of EPBH added is large. In T1 making no use of EPBH, on the other hand, this absorption is less visible (or insignificant), and not found in TA either. This suggests that the epoxy group of EPBH and THF are subjected to graft polymerization on TA.

(3) at 1745 cm$^{-1}$ and 1642 cm$^{-1}$, there are absorptions found throughout samples TA and T1 to T5. Those absorptions are considered to be due to the respective —C=O and C=C stretches.

From the foregoing, it has been confirmed that in the FTIR analysis too, the epoxy group of EPBH has an important role in THF graft polymerization. It has also been confirmed that the component of poly-THF is taken in the tannic acid derivative. It is here to be noted that the site and amount of the tannic acid derivative to which the component of poly-THF is linked are variable: they would not been fixed to one.

Then, hexamethylene diisocyanate (HDI) was obtained as the second pack from Wako Pure Chemical Industries, Ltd. and used for mixing with the aforesaid tannic acid derivatives T1 to T6 to prepare adhesive compositions whose adhesion capability was estimated in Example 1.

In another run, THF as the solvent and T5 as the first pack were mixed with HDI as the second pack in predetermined amounts (% by weight) set out in Table 2 to prepare adhesive composition Glues 1 to 4 dissolved in the solvent. Their adhesion capability was estimated in Example 1.

TABLE 2

| Name | T5 (% by weight) | HDI (% by weight) | Solvent |
|---|---|---|---|
| Glue 1 | 75 | 25 | THF |
| Glue 2 | 66 | 33 | THF |
| Glue 3 | 60 | 40 | THF |
| Glue 4 | 50 | 50 | THF |

Example 1

In Example 1, an adhesive composition (glue) was prepared using the first pack prepared in the aforesaid exemplary production example, and then estimated in terms of its adhesive force (strength). Hexamethylene diisocyanate (HDI) was obtained from Wako Pure Chemical Industries, Ltd. and used as the second pack of the adhesive composition.

The adherends used herein was an aluminum plate. A commercially available aluminum plate was cut into 8 cm×2.5 cm×0.1 cm, and cleaned pursuant to ASTM (American Society for Testing Materials) D2651 standard protocol cleaning before use. After this cleaning, the plate was fully dried, immediately followed by adhesion testing.

The adhesion testing was carried out using Autograph AG-X Plus (Shimadzu Corpora ion) for the estimation of adhesive force (tensile shear strength) on a 10000 N load cell. The crosshead speed was set at 2 mm/min, and the overlapping area of the bonded surfaces was set at 25 mm×10 mm. For the details of the testing method, see JIS K 6850, according to which an adhesive (composition dissolved in a solvent) was coated on the members to be bonded, and they were brought in close contact with each other on the overlapping area such that there was an adhesive thickness of about 2 mm obtained, followed by a heat treatment at 80° C. for 1 hour.

Figure 5:
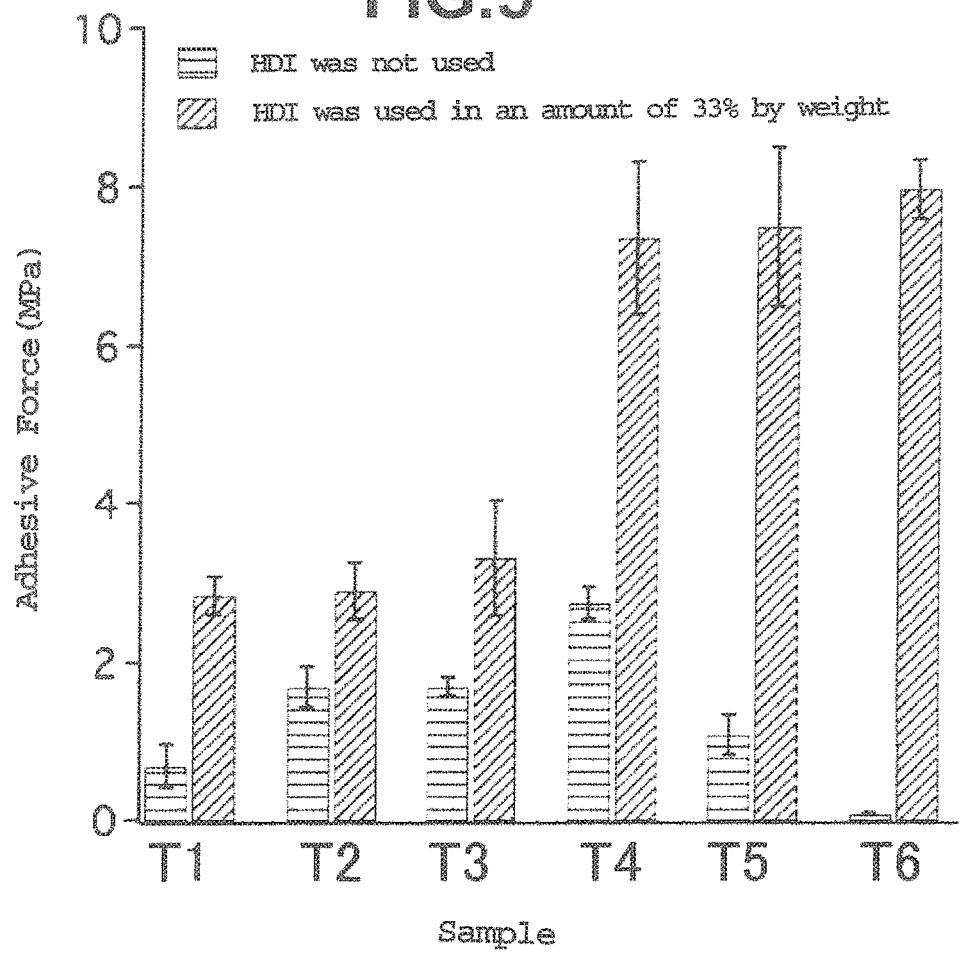
FIG. 5 is indicative of the adhesive strength characteristics of the adhesive composition of one example of the invention at the time when the composition components vary as a parameter.

FIG. 5 shows the results of adhesive force estimation where the aforesaid TA derivatives T1 to T6 were used as the first pack of the adhesive composition and the addition of 33% by weight of the second pack HDI was compared with no addition of the second pack HDI. It is to be understood that the adhesive force is expressed in terms of a simple mean value of five measurements, and that an error bar is indicative of the then standard deviation σ. This will hold for the measurements and error bars in the following estimations.

As a consequence, it is found that the combined use of the first and second packs made the adhesive force much higher as compared with the single use of the first pack. Especially when HDI was added to T4, T5 and T6 prepared by adding at least 15 eq. (molar ratio of 1:15) of EPBH to TA, the resultant adhesive force was at least twice as high as that of HDI-added T1, T2, and T3 in which the amount of EPBH added to TA was no greater than 10 eq. Specifically, the addition of 33% by weight of HDI to T4 yielded 7.36±0.96 MPa; the addition of 33% by weight of HDI to T5 yielded 7.5±1.0 MPa; and the addition of 33% by weight of HDI to T6 yielded 7.9±0.38 MPa, a value about 100 times as strong as that obtained by the single use of T6. The addition of 33% by weight of HDI to T3 yielded 3.3±0.7 MPa. Referring here to the single use of the first pack, T4 yielded the strongest adhesive force, but that adhesive force was as low as 2.75±0.2 MPa.

In this connection, the addition of 33% by weight of HDI to TA yielded an adhesive force of as low as 1.6±0.29 MPa. This would appear to be due to a deficiency of reactive OH groups.

As far as T6 is concerned, the addition of HDI caused the adhesive force to become about two-digit stronger than that obtained in the absence of HDI, meaning that with an increased crosslink, the adhesive force becomes much stronger. Much crosslinker contained in T6 would also suggest that the amount of crosslinker plays an important role in the aforesaid improvement in the adhesive force.

The aforesaid TA derivative/HDI mixture was studied for its solubility in THF before and after the heat treatment. Consequently, it has been found that before a heat treatment at 80° C., that mixture is well soluble in THF, but it remains completely insoluble in THF after the heat treatment at 80° C., meaning that as a result of the heat treatment at 80° C. in the presence of HDI, the covalent bonding of the TA derivative occurs, leaving the TA derivative insoluble in the solvent.

Figure 6:
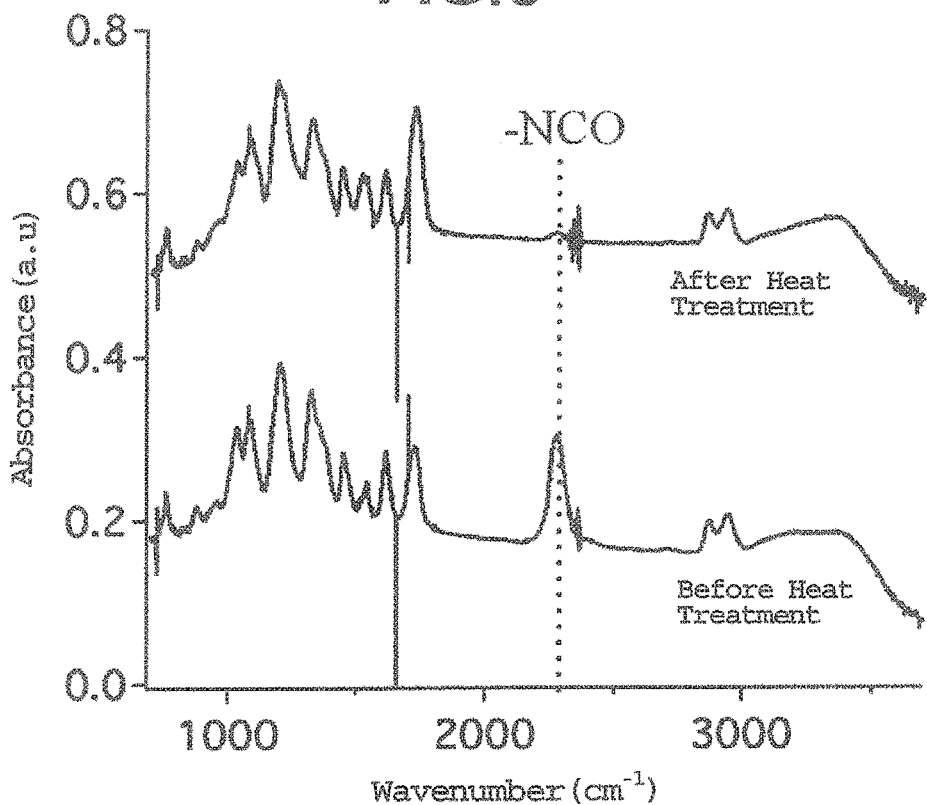
FIG. 6 is indicative of the FTIR spectra of a tannic acid/HDI composition before and after subjected to heat treatment.

The fact that the covalent bonding of the TA derivative occurs as a consequence of the heat treatment at 80° C. in the presence of HDI is also supported by FTIR measurement. The results are plotted in FIG. 6. As is the case with FIG. 4, FT-IR6100 was used as the measuring equipment. A sample contained TA derivative T5 and HDI in a weight ratio of 66:33, and was measured before and after a heat treatment at 80° C. for 45 minutes.

It has consequently been found that the peak of an isocyanate group (—NCO) having a wavenumber of about 2270 cm$^{-1}$ as measured before the heat treatment becomes considerably smaller after the heat treatment at 80° C., making sure that the covalent bonding of the TA derivative occurs by way of the heat treatment. This covalent bonding would appear to become one factor of adhesive force enhancements.

To look at the characteristic property upon heat treatment of the adhesive composition, thermogravimetric analysis (TGA) was carried out using TG/DTA6200 (SII) where an aluminum pan was used as a sample holder and alumina (Al$_2$O$_3$) powders were used as a reference, with a heating speed of 10° C./min.

Figure 7:
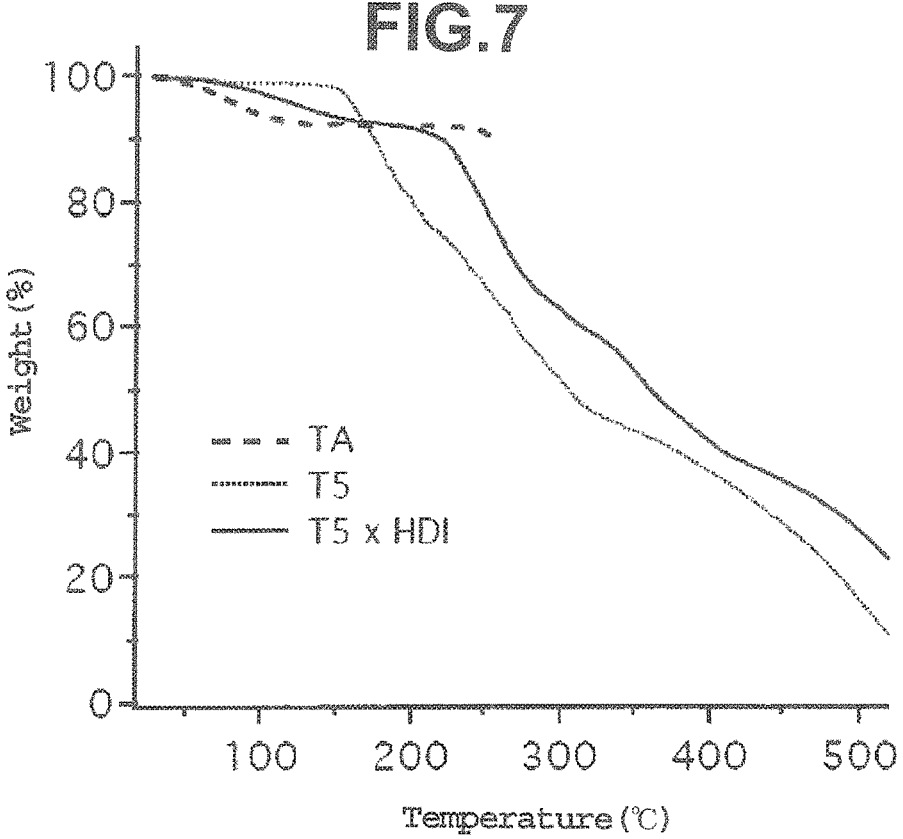
FIG. 7 shows the results of comparison of thermogravimetric loss characteristics of one example of the adhesive composition of the invention with those of tannic acid.

The results are plotted in FIG. 7. There were three samples used: TA, T5, and T5+HDI (Glue 2) containing HDI in an amount of 33% by weight relative to the total weight of T5 and HDI.

TA lost about 10% of its weight from about 50° C. to 100° C., and then burned and carbonized at about 250° C. T5 was thermally decomposed from about 100° C. to 230° C. with a weight loss of about 10%, and then decreased considerably in weight with about 230° C. as an inflection point. On the other hand, the sample containing 33% by weight of HDI added to T5 did not break down thermally up to 150° C. with no or little weight loss. Although there was a weight loss caused by thermal decomposition with 150° C. as an inflection point, yet the sample weight at 200° C. was maintained at about 80% before the heating. From this result it has been found that the heat resistance is improved by the crosslink effect, and that the upper limit to the heat treatment temperature for the adhesive composition comprising a TA derivative T5/HDI mixture is 200° C., preferably 150° C.

Then, what influence the amount of the second pack HDI added has on an adhesive force was examined. For this purpose, adhesive compositions Glue 1 to Glue 4 were prepared by mixing the first pack tannic acid derivative T5 with the second pack HDI in such predetermined % by weights set out in Table 2 and dissolving the mixture in a solvent THF, and the adhesive force of them relative to an aluminum substrate was estimated. The heat treatment was carried out at 80° C. for 1 hour.

Figure 8:
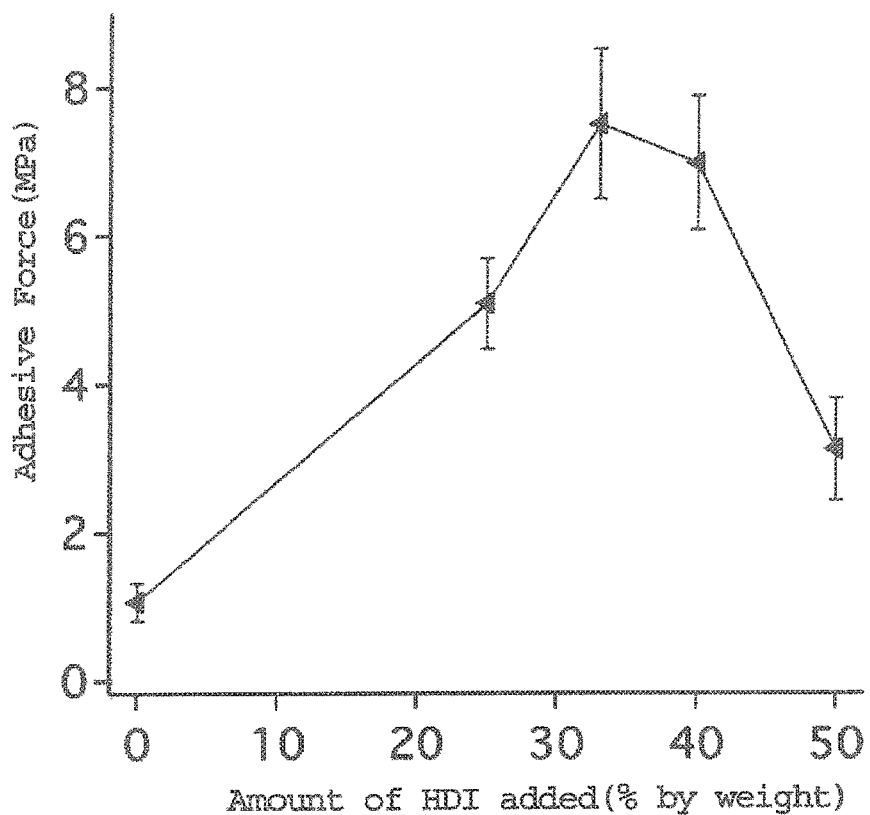
FIG. 8 is a characteristic diagram indicative of the influences on adhesive force of the amount of the second pack added.

The results are plotted in FIG. 8 together with the results of FIG. 5 upon no addition of HDI.

As is also set out in Table 2, the amount of HDI added is given in terms of % by weight relative to the total weight of the first and second packs. The addition of HDI ensures that the adhesive force is stronger as compared with no addition of HDI (0% by weight), and the adhesive force reached a maximum (7.5±1.0 MPa) at 33% by weight (Glue 2) and went down as the amount of HDI was greater than that. The addition of no less than 5% by weight to no greater that 50% by weight of the second pack HDI made the adhesive force at least twice as strong as in the case of no addition of HDI, and the addition of no less than 30% by weight to no greater than 40% by weight of HDI yielded an adhesive force of about 7 MPa, about seven times as strong as in the case of no addition of HDI.

Then, relationships between the heat treatment temperature and the adhesive force were examined using Glue 2 or an adhesive composition containing 33% by weight of HDI relative to the total weight of T5 and HDI. The heat treatment temperature was set at room temperature (23° C.), 40° C., 60° C., 80° C., and 100° C.; an application substrate was made of aluminum; and the heat treatment time was set at 1 hour.

Figure 9:
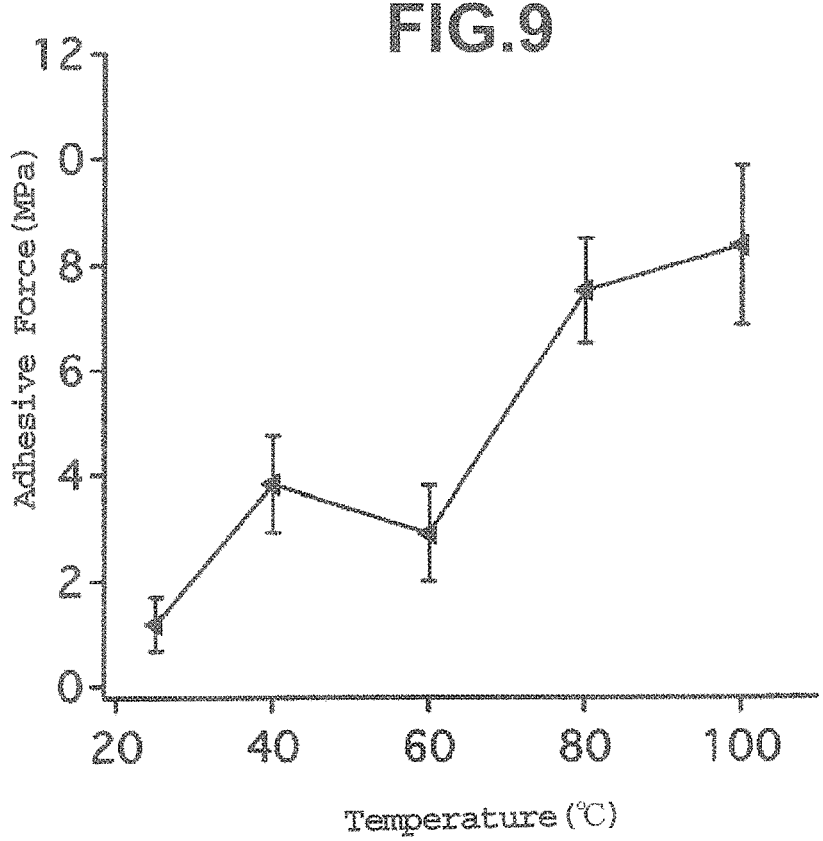
FIG. 9 is a characteristic diagram indicative of the relationships between heat treatment temperatures and adhesive force.

The results are plotted in FIG. 9.

The higher the heat treatment temperature went from room temperature (23° C.), the nearly flatly stronger the adhesive force was. Because it has been found from the aforesaid TGA analysis that Glue 2 does not break down thermally up to 150° C., it would appear to be effective for adhesive force enhancements to carry out the heat treatment at temperatures as close to the upper limit of 150° C. as possible.

Then, relationships between the heat treatment time and the adhesive force were examined using an adhesive composition (Glue 2). The heat treatment time was set at 15 minutes, 30 minutes, 45 minutes, and 60 minutes; an application substrate was made of aluminum; and the heat treatment temperature was set at 80° C.

Figure 10:
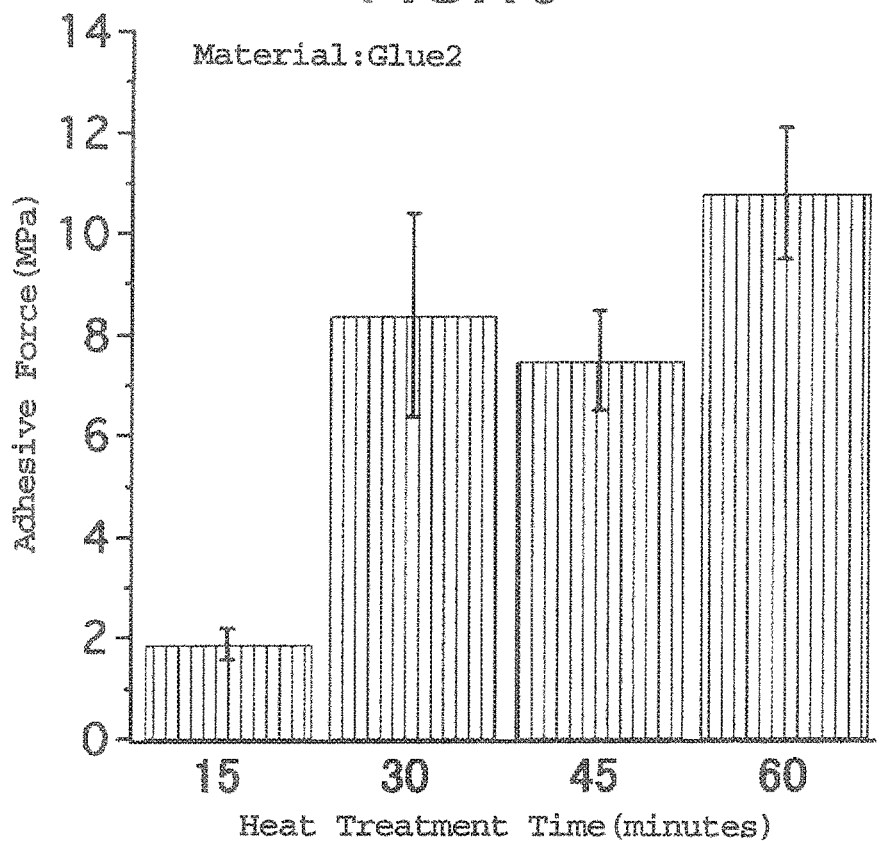
FIG. 10 is a characteristic diagram indicative of the relationships between heat treatment times and adhesive force.

The results are plotted in FIG. 10.

In the heat treatment time of 15 minutes, the polymerization reaction did not well proceed, resulting in a poor adhesive force, but in the heat treatment time of 30 minutes or longer, there was a good-enough adhesive force of at least 7.5 MPa obtained.

Then, the effect of the filler was examined. The addition of fillers is generally well-known in the adhesive field to obtain high strength and a high degree of cure at reduced material costs. Here the effect of the filler was examined using Glue 2 as a basic adhesive composition, $CaCO_3$ as the filler, and aluminum as an application substrate. The filler has an average diameter of 13 μm. The amount of the filler to be added was set at 0% by weight, 10% by weight, 20% by weight, 30% by weight, 40% by weight, and 50% by weight relative to the total weight of the first and second packs. The heat treatment was carried out at 80° C. for 30 minutes.

Figure 11:
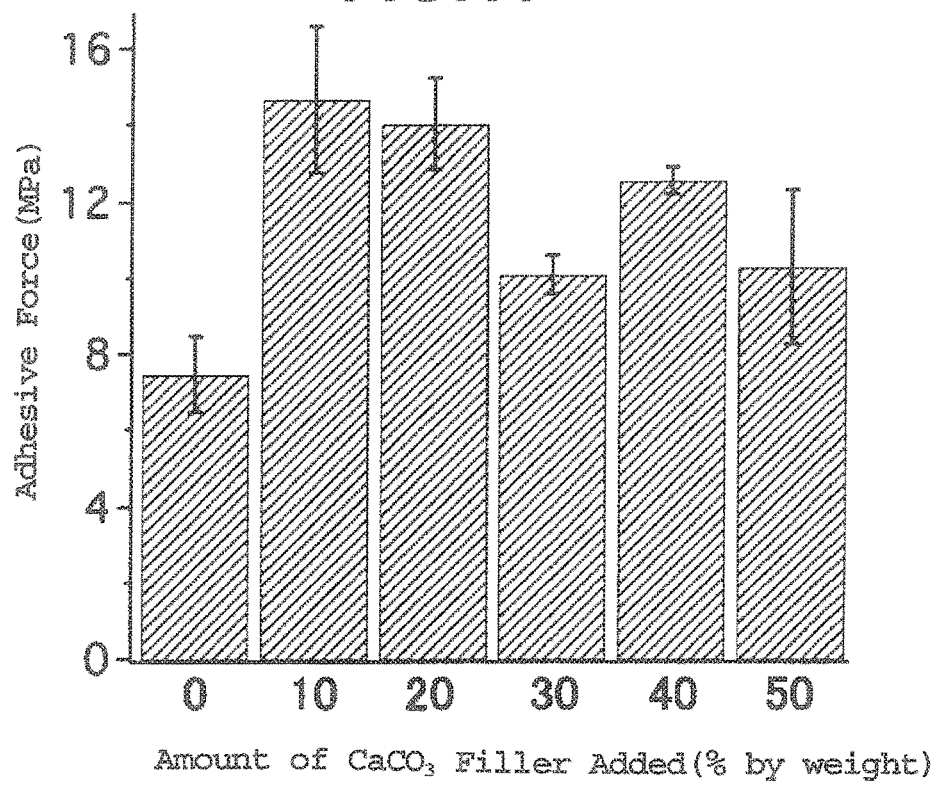
FIG. 11 is a characteristic diagram indicative of the relationships between the amount of the filler added and adhesive force.

Relationships between the amount of the filler added and the adhesive force are shown in FIG. 11.

The maximum adhesive force of 14.71±1.9 MPa was obtained at the time when the amount of the filler added was 10% by weight. This value is about twice as large as 7.5±1 MPa at the time when no filler is added. As the amount of the filler added exceeded 10% by weight, the lower the adhesive force tended to be, but the adhesive force at the time when the filler was added in an amount of 50% by weight was 10.38±2.02 MPa significantly higher than that obtained with no addition of the filler. The addition of the $CaCO_3$ filler, because of being cheap, would appear to be effective for both adhesive force enhancements and material cost reductions.

Figure 12:
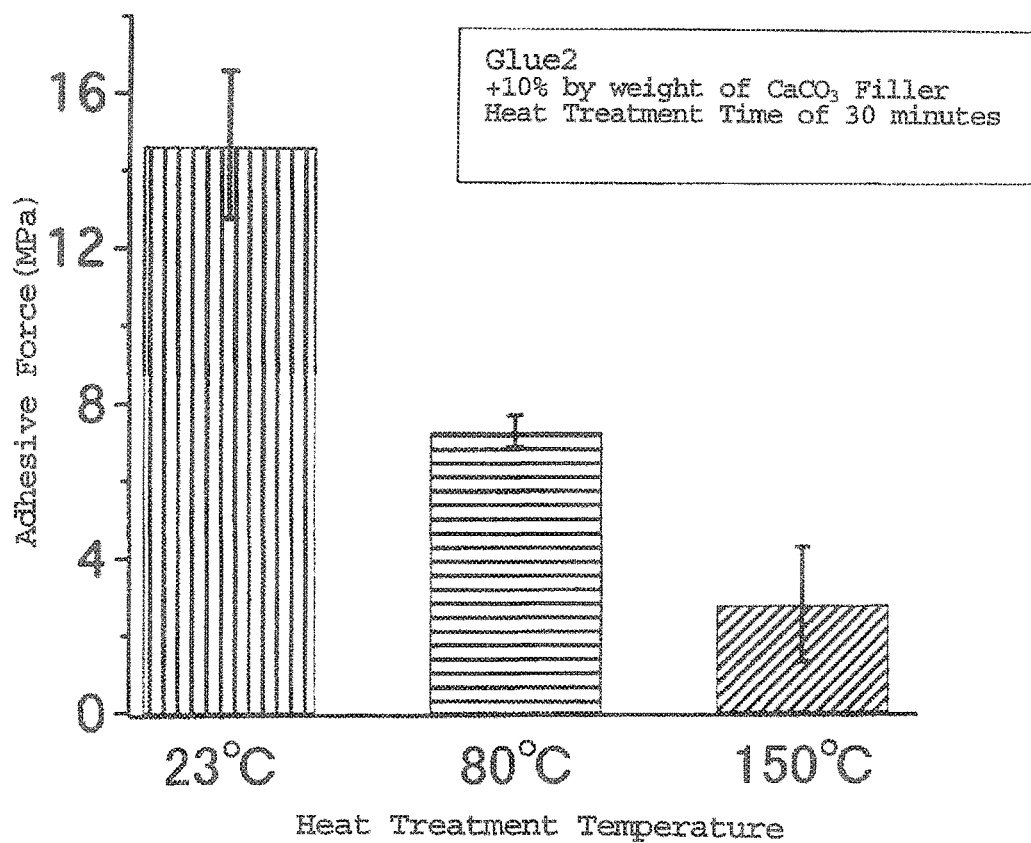
FIG. 12 is a characteristic diagram indicative of the relationships between the heat treatment temperatures and adhesive force at the time when the filler is added.

Relationships between the heat treatment temperature and the adhesive force at the time when the $CaCO_3$ filler was added in an amount of 10% by weight are shown in FIG. 12. The highest adhesive force of 14.7±1.9 MPa was obtained at room temperature (23° C.), and the adhesive force went down with a rise of the heat treatment temperature.

Then, adhesive forces with respect to a variety of materials were examined. The materials (adherends) used here were wood, glass, stainless steel (SUS304(2B)), copper (Cu), and aluminum (Al). Glue 2 was used as the adhesive composition, and the heat treatment was carried out at 80° C. for 1 hour.

Lauan veneer cut to an even size of 0.3 cm×25 cm×100 cm was used for wood.

Commercially available glass was cleaned of surface dirt with the use of a liquid detergent, and then immersed successively in ethanol, n-hexane and acetone for ultrasonic washing. Then, drying was carried out at room temperature (23° C.), immediately followed by adhesion testing.

Commercially available stainless steel and copper were each cut to an even size of 8 cm×2.5 cm×0.1 cm as was the case with the aforesaid aluminum, and washed according to ASTM (American Society for Testing Materials) D2651 standard protocol. After this washing, full drying was carried out, immediately followed by adhesion testing.

Figure 13:
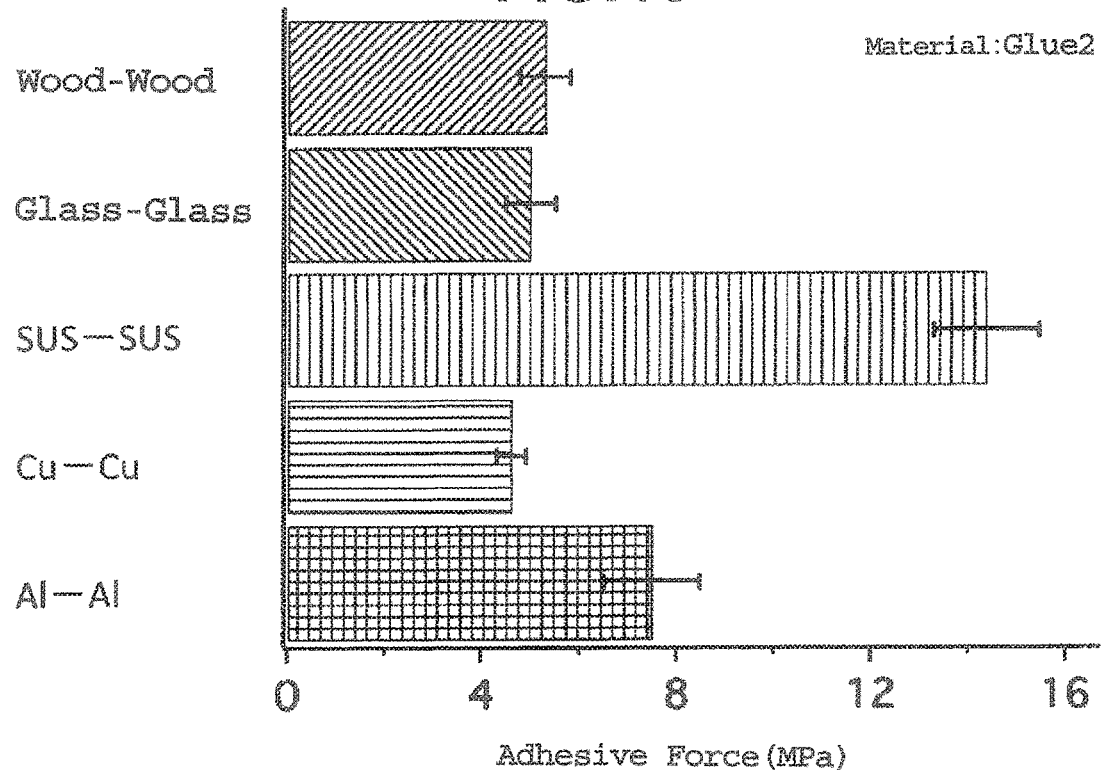
FIG. 13 is a characteristic diagram indicative of adhesive forces relative to various materials.

As a result, an adhesive force of as high as at least 4 MPa was obtained at the time where similar materials were bonded together (FIG. 13). At the time of bonding SUS and SUS together in particular, there was an adhesive force of as high as 14.36±1.07 MPa obtained.

Figure 14:
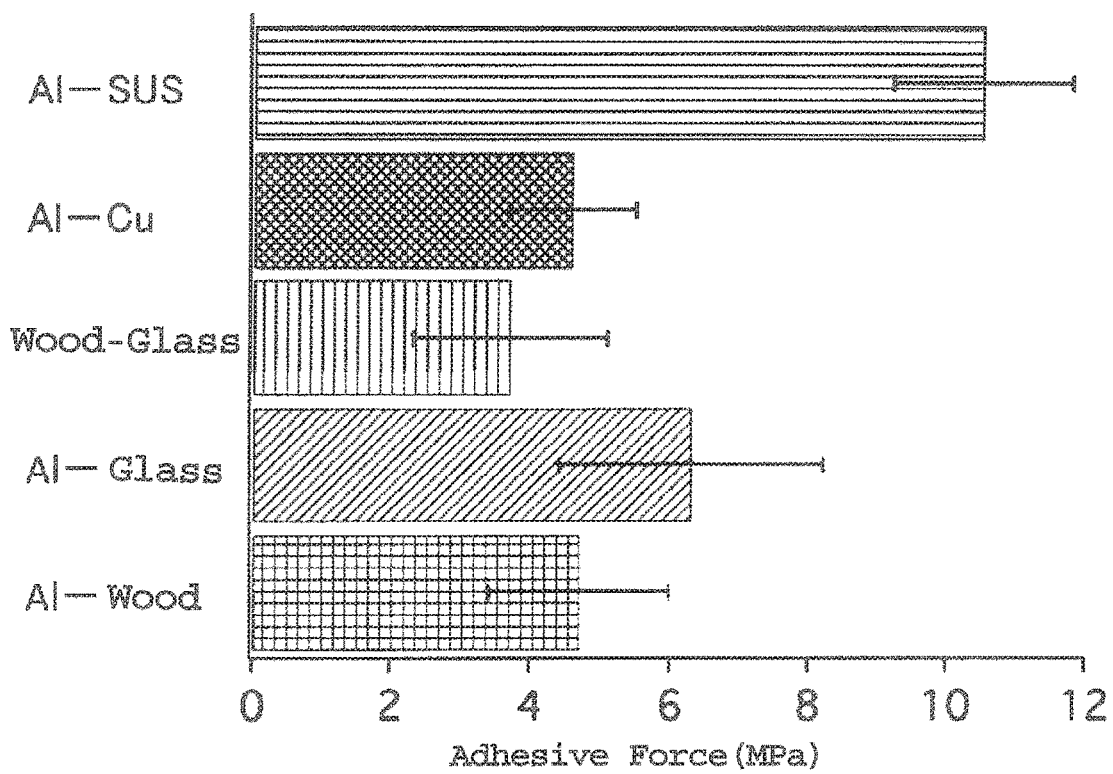
FIG. 14 is a characteristic diagram indicative of adhesive forces relative to various materials.

Also at the time of bonding different materials together, there was a high adhesive force obtained as was the case with the bonding of similar materials, as shown in FIG. 14. Especially when SUS and Al (aluminum) were bonded together, there was an adhesive force of as high as 10.4±1.3 MPa obtained.

TA is known to form a complex of a tridentate coordination with $Fe^{3+}$. SUS304(2B), because of containing $Fe^{3+}$, would appear to yield a particularly strong adhesive force in combination with coordinate bonding with $Fe^{3+}$.

Changes in the adhesive force of adhesives due to the presence or absence of the filler were examined for a variety of materials. The materials (adherends) estimated here were stainless steel (SUS304(2B)), copper (Cu) and aluminum (Al) provided for as mentioned above. Glue 2 was used as the adhesive composition, and $CaCO_3$ was used as the filler. The amount of the $CaCO_3$ filler added was 10% by weight relative to Glue 2, and the heat treatment was carried out at 80° C. for 45 minutes.

Figure 15:
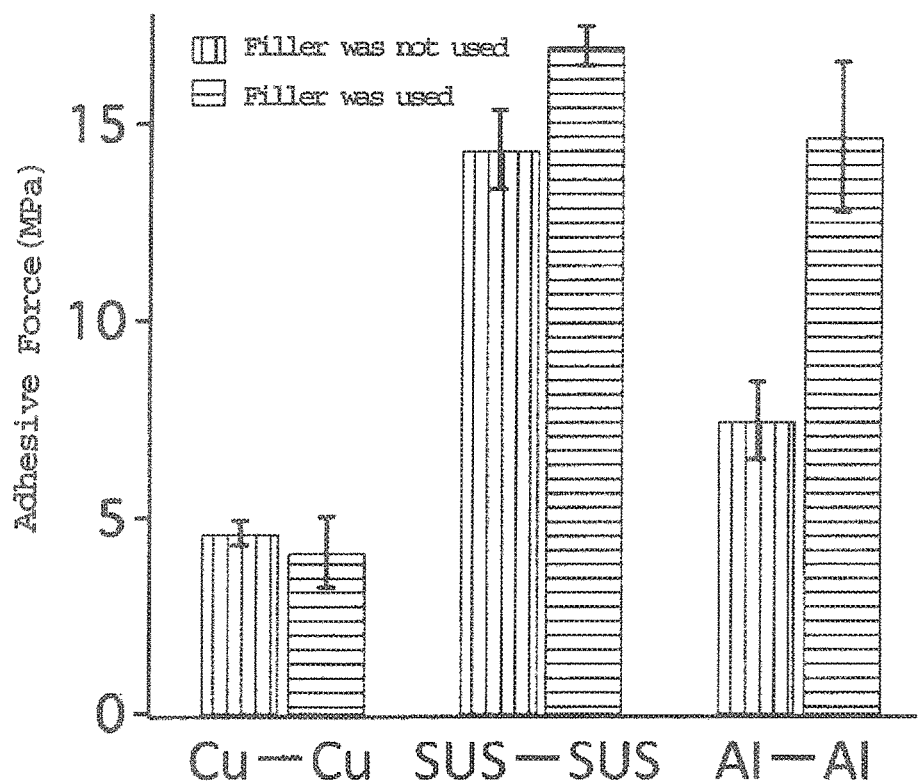
FIG. 15 is a characteristic diagram indicative of a difference in adhesive forces relative to various materials due to the presence or absence of the addition of the filler.

As can be seen from the results shown in FIG. 15, the addition of the filler yielded an adhesive force on a level similar to or greater than the adhesive force obtained with no addition of the filler. Especially when aluminum materials were bonded together, the addition of the filler yielded an adhesive force about twice as large. When SUS and SUS were bonded together, the addition of the filler yielded an adhesive force of as strong as 17±0.5 MPa.

One of the reasons for such high adhesive forces being obtained would appear to be due to an increase in the viscosity of adhesives.

The fact that such high adhesive forces are obtained relative to a variety of adherends by the addition of inexpensive fillers has an industrially great merit.

Then, the mechanical behavior of a coating film (adhesive film) comprising an adhesive made up of the tannic acid derivative was examined through a comparison with that obtained using tannic acid (TA). Note here that T5 was used as the tannic acid derivative.

A commercially available glass plate was used as the substrate, and after the glass plate was cleaned of surface dirt with use of a liquid detergent, it was immersed successively in ethanol, n-hexane and acetone for ultrasonic washing. Drying was then carried out at room temperature (23° C.), immediately followed by formation of a coating film thereon.

The coating film was formed by dropwise addition of a solution of TA and T5 with tetrahydrofuran as a solvent to a glass substrate and carrying out heat treatment at 80° C. for 45 minutes.

The estimation of the coating film was made through observations of film morphologies (cracking, creasing, peeling, etc.) upon coating on the substrate and observations of film morphologies after 10 peeling tests using a Scotch (registered trademark) tape. Note here that this peeling test was conducted according to the JIS Z 1522 Adhesion Test.

Figure 16:
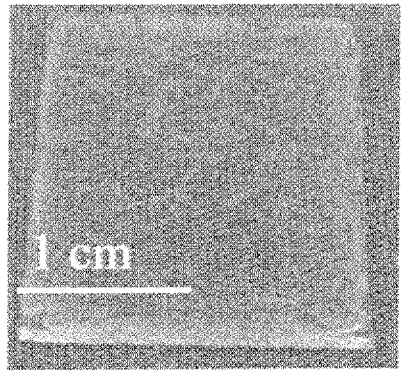
FIG. 16 is a set of comparative photographs indicative of the surface morphologies of coating films at the time when tannic acid is derivatized and not.
Figure 16:
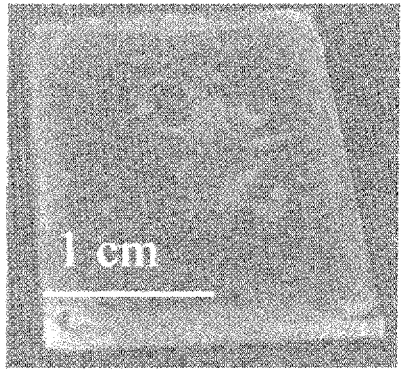
Figure 16:
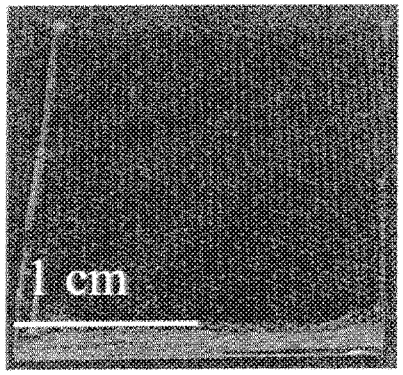
Figure 16:
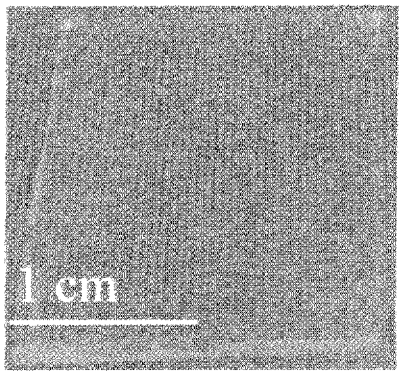

The results are shown in FIG. 16.

The surface morphology of the coating film obtained using TA was found to have cracks and creases whereas the surface morphology of the coating film obtained using T5 was found to be homogeneous and free of any crack or crease. As a result of the peeling test, the coating film obtained using TA was found to be peeled or swollen whereas the coating film obtained using T5 was found to be uniform and free of peeling or swelling. Note here that the thickness of the coating film was approximately 100 µm.

The coating film obtained using TA would appear to be brittle yet rigid by way of a number of hard aromatic rings and hydrogen bonds within and without the molecule, whereas the coating film obtained using T5 would appear to be flexible, stable and uniform because flexible THF is added to it.

Figure 17:
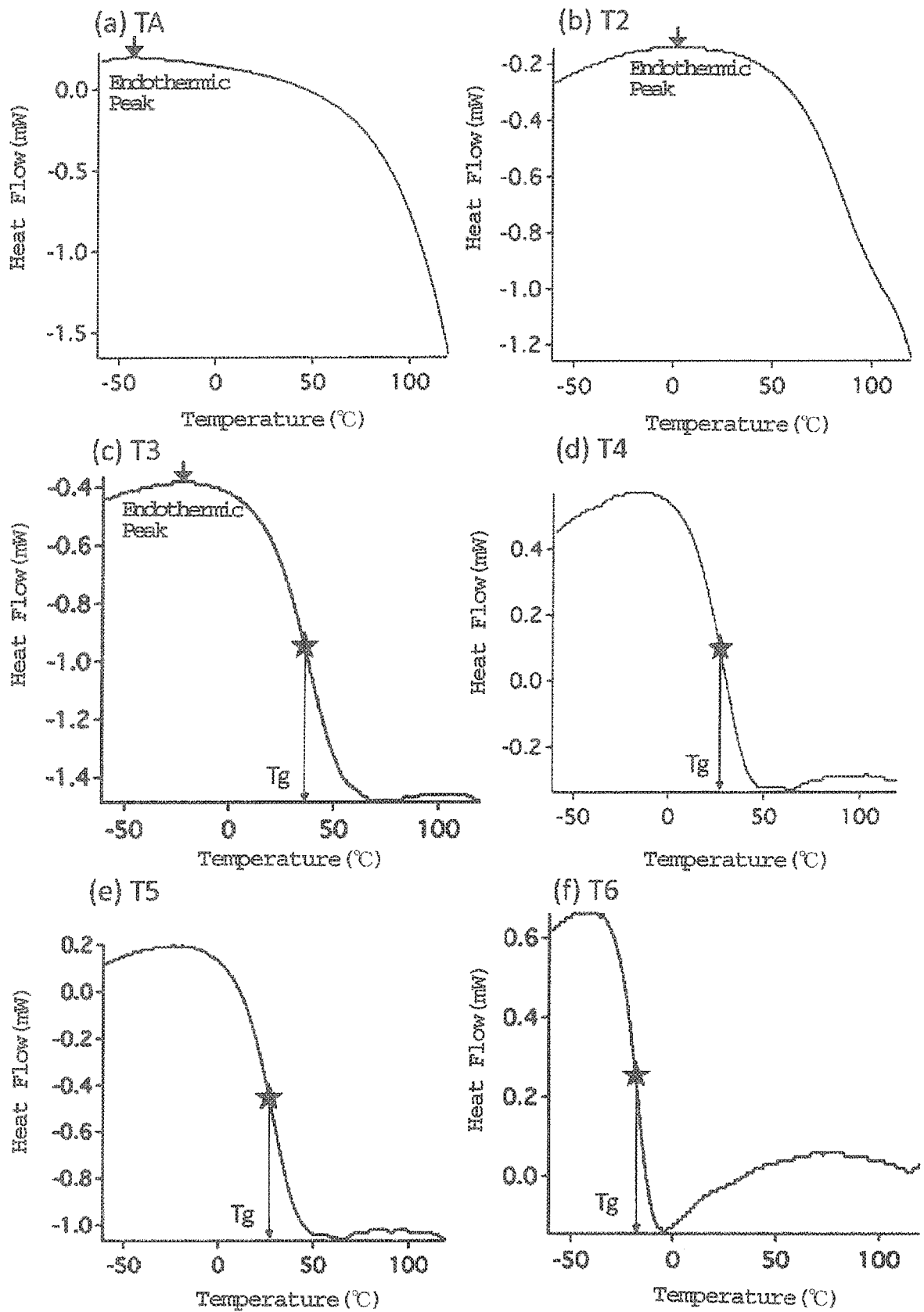
FIG. 17 is a characteristic diagram indicative of glass transition temperature changes at the time when tannic acid is derivatized.

To confirm that the tannic acid derivative of the invention has flexibility, glass transition temperatures were measured with the use of a differential scanning calorimeter (DSC-60 made by Shimadzu) where tannic acid derivatives T2 to T6 were examined with TA as a reference. The results are plotted in FIG. 17.

It has consequently been found that there is no definite glass transition observed with TA and T2, but glass transition is observed with T3 to T6, with their glass transition points (glass transition temperature) of no higher than 40° C. In the case of T6 in particular, it has been found that glass transition takes place at a temperature of as low as −18° C. It has thus been ascertained that the tannic acid derivatives having such low glass transition temperatures give flexibility to the coating films.

Adhesives having flexibility make tough yet pliable adhesion possible; the adhesive of the invention is preferable in this sense too.

Example 2

In Example 2, reference is made to the results of experimentation and estimation of polymer films formed using the adhesive composition of the invention with respect to bactericidal and sterilizing actions on *E. coli*.

Figure 18:
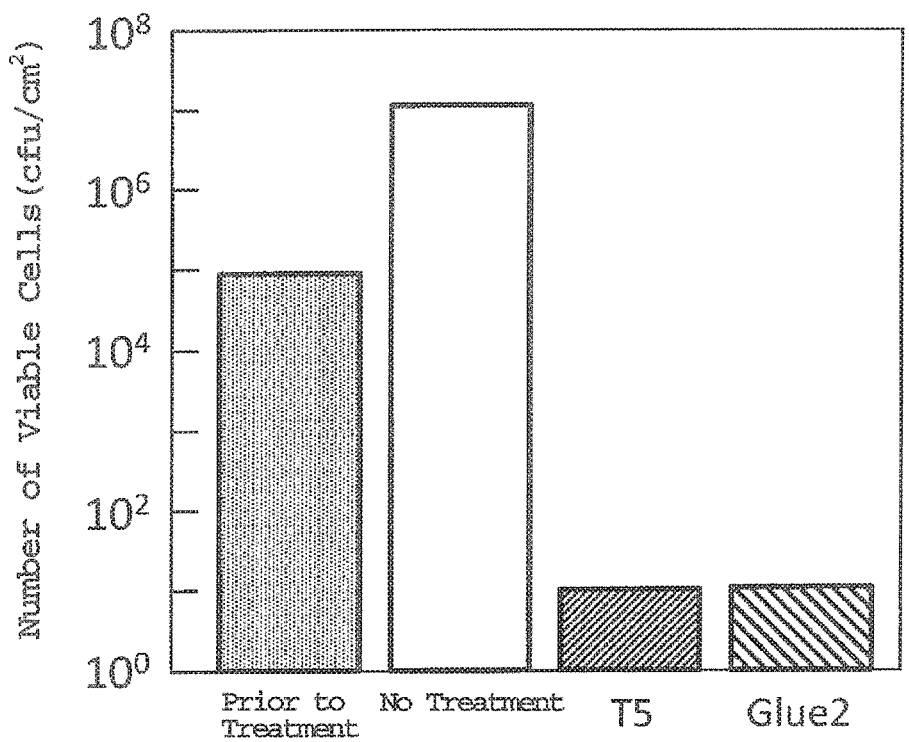
FIG. 18 is a characteristic diagram indicative of the bactericidal and sterilizing actions of one composition of the invention.

As preparations to Example 2, a T5 film sample was formed by coating T5 on a glass substrate followed by peeling; a Glue 2 film sample was formed by forming a coating film comprising Glue 2 followed by peeling; and a reference film sample was formed of a film with nothing coated on it. Then, each film was brought into contact with a culture mass incubated with *E. coli* to make estimation of its bactericidal action on *E. coli*. Details of how to estimate were pursuant to JIS 2801: Film Testing, and the time of contact of each film with the culture mass was 24 hours. The results are shown in FIG. 18. Note here that the "prior-to-treatment" stands for the number of bacteria in the culture mass (the number of bacterial colonies).

The bactericidal and sterilizing capabilities of the sample provided with a coating comprising Glue 2 were equivalent to those of TA derivative T5, and even with a coating film obtained by polymerization of T5 added with HDI, the bactericidal and sterilizing capabilities of the TA derivatives were kept intact.

Accordingly, the polymer film formed of the adhesive composition of the invention would have high-enough bactericidal and sterilizing capabilities.

Example 3

In Example 3, reference is made to the results of experimentation and estimation of adsorption of ammonia gas ($NH_3$ gas) by a polymer film formed using the adhesive composition of the invention.

The adsorptive performance of ammonia gas by the adhesive of the invention was examined by the QCM (Quartz Crystal Microbalance) method.

Three (3) mg, 6 mg, 8 mg, and 12 mg of a Glue 2 solution were cast on the gold electrode of the QCM, and then heat treated at 80° C. for 2 hours to form a polymer film. Thereafter, the polymer film was placed in a vessel filled up with ammonia water and tightly sealed up to expose it to ammonia gas in a room temperature (23° C.) environment while monitoring changes-with-time in a crystal oscillator's frequency change $\Delta f$. The results are shown in FIG. 19.

Figure 19:
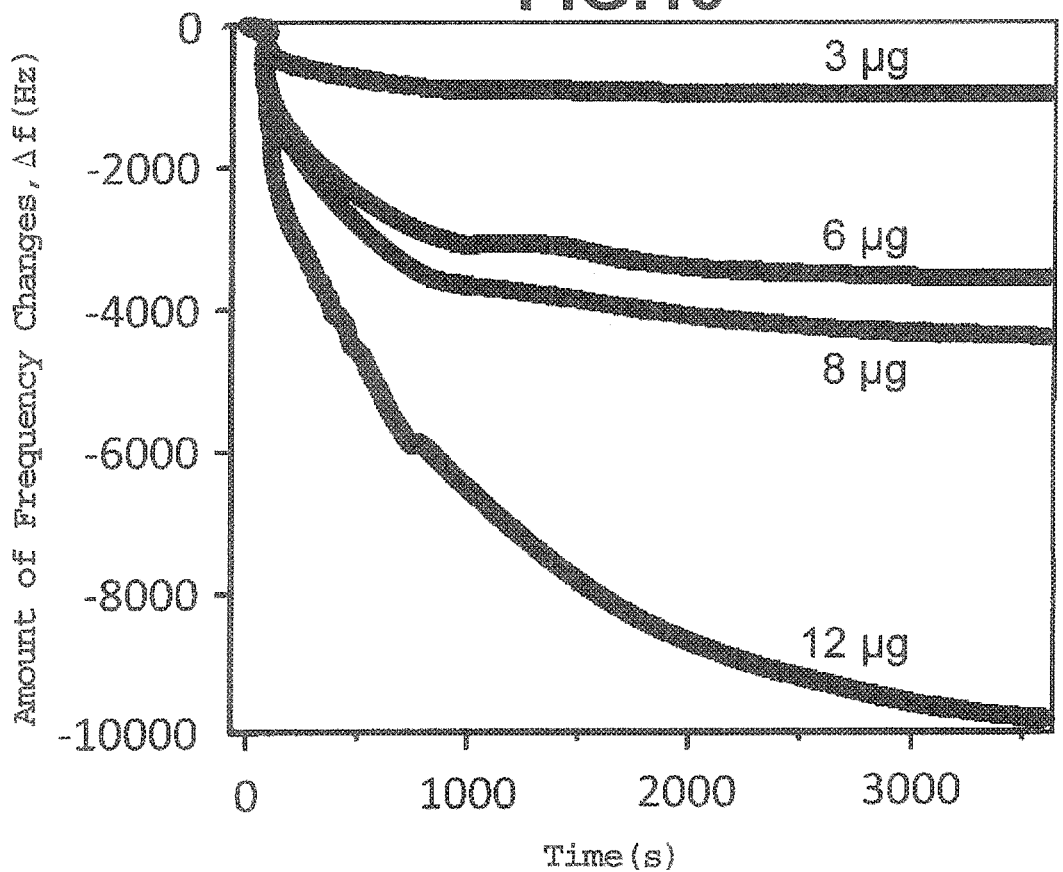
FIG. 19 is a characteristic diagram indicative of frequency changes of samples exposed to ammonia gas ($NH_3$ gas) as measured by the QCM method.

Based on the results of measurement shown in FIG. 19, the relationships between the amount of Glue 2 and the amount $\Delta m$ of ammonia gas adsorbed were determined. The results are shown in FIG. 20.

Figure 20:
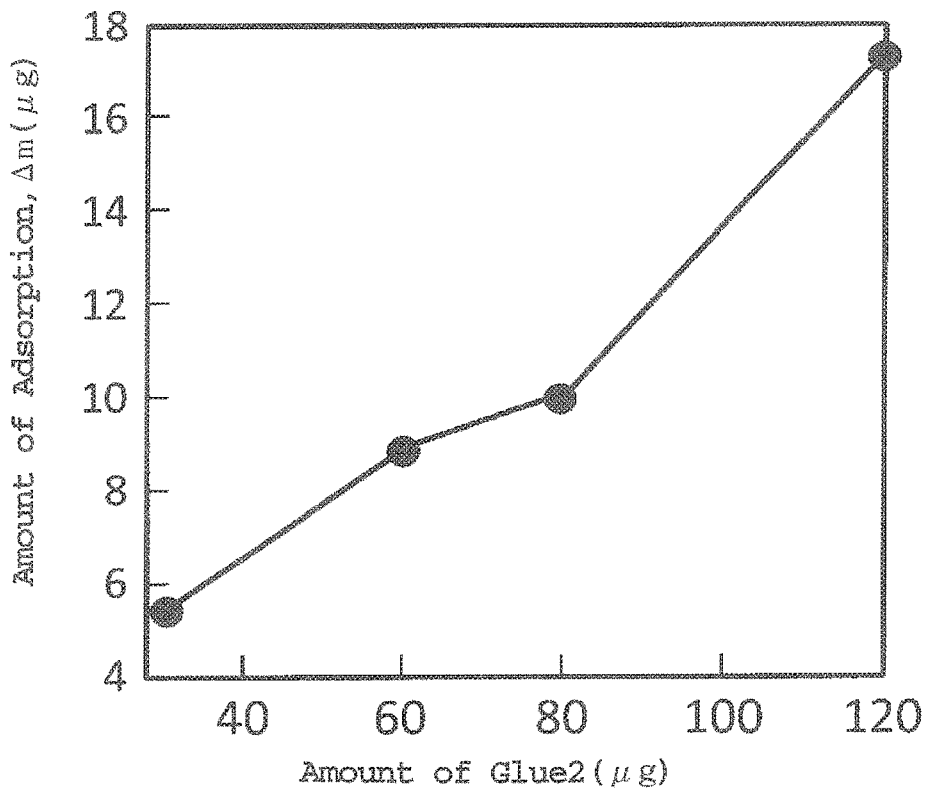
FIG. 20 is a characteristic diagram indicative of the adsorptive characteristics of ammonia gas by one composition of the invention.

As can be seen from FIG. 20, the amount of Glue 2 and the amount of adsorption of ammonia gas are nearly proportional. As the amount of Glue 2 cast and the thickness of the polymer film formed of Glue 2 are proportional, the adsorption of ammonia gas could have taken place mainly at a bulk portion of this polymer film.

In general, gas adsorption often takes place at an interface, but as long as this polymer film is concerned, gas adsorption occurs at the bulk portion. By use of this polymer film, accordingly, it is possible to achieve effective adsorption of harmful gases such as ammonia gas, and by making this polymer film thicker, it is possible to achieve adsorption of much more gases.

Comparative Example 1

In Comparative Example 1, the importance of tannic acid (tannic acid derivative) in the adhesion function was checked out. For this purpose, estimation was made of the adhesive force of a two-pack material using GPTHF (Gl-poly(EPBH-co-THF) synthesized out of glycerol, THF and EPBH as the first pack and HDI as the second pack.

Figure 21:
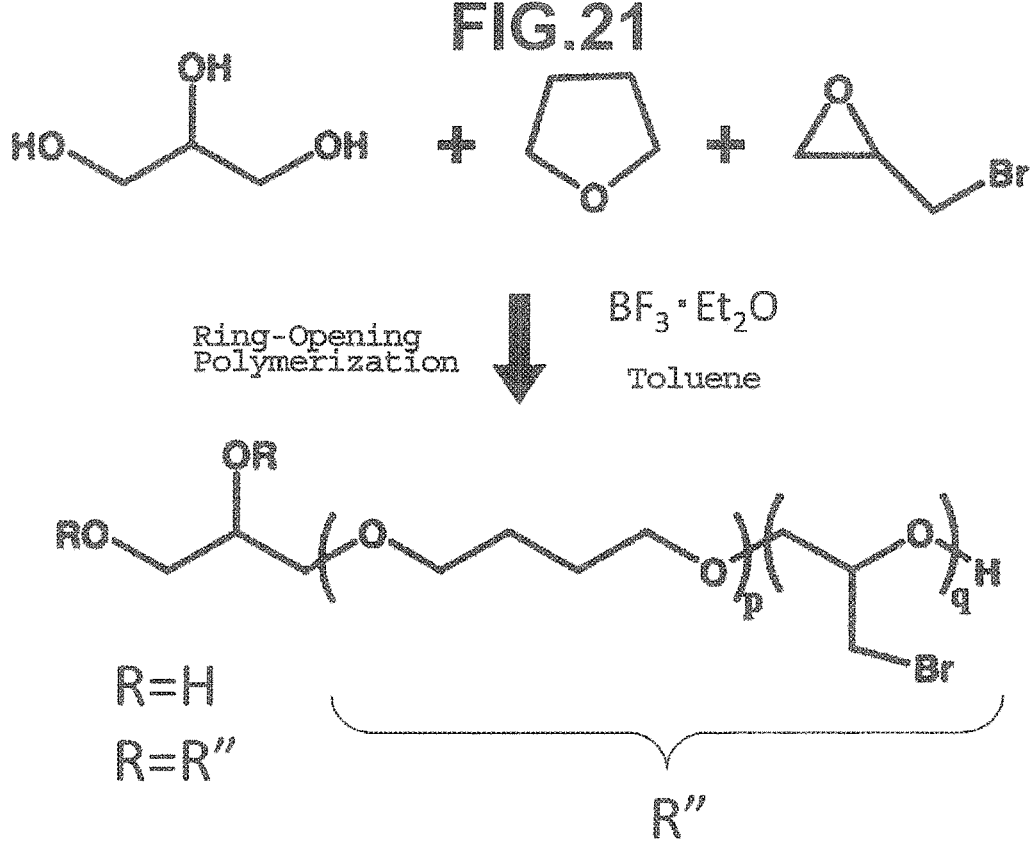
FIG. 21 is illustrative of the chemical reaction diagram for one comparative example.

GPTHF, in which the tannic acid derivative of the invention is replaced by glycerol, is synthesized by ring-opening polymerization reaction with Lewis acid as a catalyst as is the case with the synthesis scheme for the first pack of the invention. See FIG. 21.

Specifically, GPTHF was synthesized in the following procedure.

First of all, 2.2 mmol of glycerol were weighed out under an argon gas purge, and then put in a two-neck round bottom flask. That flask was twice filled up with argon gas, and 10 ml of toluene (super dehydration) were added to it. Then, an injector was used to add $BF_3 \cdot Et_2O$ as a catalyst, and agitation was carried out with the use of a magnetic stirrer. Note here that the amount of $BF_3 \cdot Et_2O$ was set at 1 mol % of EPBH to be later added, and temperatures were adjusted such that the reaction temperature became 0° C.

Thereafter, 3.5 ml (44 mmol) of dehydrated THF were poured into the flask followed by a 10-minutes stirring.

After that, 22 mmol of EPBH were very slowly poured into the flask, and the flask was rotated for stirring at room temperature (23° C.) for 18 hours, getting the reaction done.

Thereafter, excessive monomers and solvent were removed using a rotary pump at 80° C. Then, a transparent, highly viscous liquid was withdrawn as product.

Then, it has been confirmed by way of $^1H$ NMR that this product has a GPTHF structure. Note here that JEOL ECS-400 (JEOL) was used as $^1H$ spectrum measuring equipment to measure spectra in a solution of DMSO-d (dimethyl sulfoxide-deuterium) containing 0.05% by volume of TMS (tetramethylsilane), and that the chemical shift value was measured and indicated in ppm with TMS as a reference.

Figure 22:
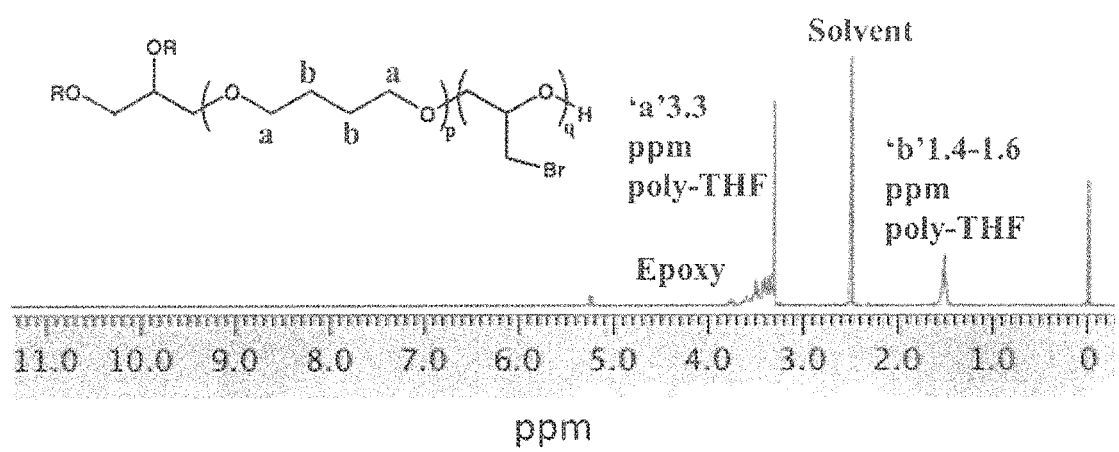
FIG. 22 is indicative of the $^1H$ NMR spectra in one comparative example.

The results are shown in FIG. 22.

One point four (1.4) to 1.6 ppm and 3.3 ppm peaks indicative of poly-THF were observed. A number of peaks indicative of reaction products derived from epoxy and glycerol (resonance) were observed in a 3.3 to 3.7 ppm region; it has been confirmed that this product has a GPTHF structure.

Then, 60 µl of an adhesive in which a THF solvent was added to the first pack GPTHF and the second pack HDI (crosslinker) were added dropwise to and coated on an aluminum (Al) substrate, and then estimated in terms of adhesive force according to the estimation method of Example 1. However, the heat treatment time was changed to 2 hours. The heat treatment temperature is 80° C. as is the case with Example 1.

The weight ratio between GPTHF and HDI was set at 3:1 and 2:1 as shown in Table 3, and the respective adhesives were called Glue 11 and Glue 12.

TABLE 3

| Name | Polymer | Composition Ratio Polymer:Crosslinker (w/w) | Adhesive Force (MPa) |
| --- | --- | --- | --- |
| Glue 11 | GPTHF | 3:1 | No greater than the measurement lower limit |
| Glue 12 | GPTHF | 2:1 | No greater than the measurement lower limit |

It has consequently been ascertained that both Glue 11 and Glue 12 using GPTHF in place of the tannic acid derivative have no adhesive force because their adhesive force is no greater than the measurement lower limit.

From the results of Comparative Example 1, it has also been found that in the adhesive of the invention, the tannic acid derivative has an important role.

A number of reactive groups (OH radicals in both aromatic groups and aliphatic groups) contribute to a good deal of high-speed crosslinking yielding a strong adhesive force, and the tannic acid derivative brings about a tradeoff between suitable rigidity and flexibility; so the adhesive of the invention makes it possible to achieve tough adhesion.

INDUSTRIAL APPLICABILITY

According to the invention, it is possible to provide an adhesive composition that is produced out of a naturally occurring material considered less likely to have adverse influences on the human body and has a necessary and sufficient adhesive force of at least 1 MPa as well as a bonding method using that adhesive composition. This adhesive composition has general versatility because of having a high adhesive force for a variety of materials such as metals, glasses and woods. In addition, this adhesive composition is capable of preventing rust and killing and sterilizing bacteria because of containing tannic acid. This prevents a bonded surface from getting corroded by rust and bacteria and breaking down with the elapse of time. It is thus possible to provide an adhesive composition that keeps safe and stable-with-time adhesive capability and can be used for general purposes with a necessary and sufficient adhesive force, having expectations for broader applications.

What is claimed is:

1. An adhesive composition comprising at least a first pack and a second pack, wherein:
    the first pack contains a tannic acid derivative in which a hydrogen atom in at least some hydroxyl group of tannic acid is substituted by a chain hydrocarbon group having a constitutional unit which results from ring-opening polymerization of a compound having a furan ring, and
    the second pack contains a hydrocarbon having at least two cyanate groups or a derivative of the hydrocarbon.

2. The adhesive composition according to claim 1, wherein the chain hydrocarbon group is derived from a compound having an epoxy group comprising a three-membered ring.

3. The adhesive composition according to claim 2, wherein the compound having an epoxy group is one or more selected from the group consisting of propylene oxide, 1,2-epoxyhexane, 1,2-epoxyoctane, 1,2-epoxydecane, epibromohydrin, epichlorohydrin, epifluorohydrin, and epiiodohydrin.

4. The adhesive composition according to claim 1, wherein the chain hydrocarbon group in the tannic acid derivative is grafted by the constitutional unit which results from ring-opening polymerization of the compound having the furan ring.

5. The adhesive composition according to claim 4, wherein the compound having a furan ring is tetrahydrofuran or 2-methyltetrahydrofuran.

6. The adhesive composition according to claim 1, wherein a molar ratio between the tannic acid and the chain hydrocarbon group is no less than 1:1 to no greater than 1:50.

7. The adhesive composition according to claim 1, wherein the number of carbons in the hydrocarbon or hydrocarbon derivative in the second pack is no less than 2 to no greater than 64.

8. The adhesive composition according to claim 1, wherein the second pack is one or more selected from the group consisting of hexamethylene diisocyanate, tetramethylene diisocyanate, diphenyl-methane diisocyanate, and isophorone diisocyanate.

9. The adhesive composition according to claim 1, wherein in the tannic acid derivative, a hydrogen atom in some hydroxyl group positioned in a terminal aromatic ring of the tannic acid is substituted by the chain hydrocarbon group.

10. The adhesive composition according to claim 1, comprising the first pack, the second pack, and a filler.

11. A structure, wherein a mixture of the first and second packs of the adhesive composition according to claim 1 is applied to at least a portion of an exposed surface thereof.

12. A process of producing an adhesive composition including at least a first pack and a second pack, comprising:
a step of providing tannic acid and a chain hydrocarbon having an epoxy group;
a step of producing the first pack by mixing together the tannic acid and the chain hydrocarbon having an epoxy group in a solvent containing a compound having a furan ring to react the tannic acid with the chain hydrocarbon having an epoxy group thereby forming a tannic acid derivative in which a hydrogen atom in at least some hydroxyl group of the tannic acid is substituted by a chain hydrocarbon group having a constitutional unit which results from ring-opening polymerization of a compound having a furan ring; and
a step of providing the second pack containing a hydrocarbon having two or more cyanate groups or a derivative of the hydrocarbon.

13. The process of producing an adhesive composition according to claim 12, wherein the chain hydrocarbon having an epoxy group is a compound having an epoxy group comprising a three-membered ring.

14. The process of producing an adhesive composition according to claim 13, wherein the compound having an epoxy group comprising a three-membered ring is one or more selected from the group consisting of propylene oxide, 1,2-epoxyhexane, 1,2-epoxyoctane, 1,2-epoxydecane, epibromohydrin, epichlorohydrin, epifluorohydrin, and epiiodohydrin.

15. The process of producing an adhesive composition according to claim 12, wherein the compound having a furan ring is tetrahydrofuran or 2-methyltetrahydrofuran.

16. The process of producing an adhesive composition according to claim 12, wherein a molar ratio between the tannic acid and the chain hydrocarbon group having at least one hydroxyl group is no less than 1:1 to no greater than 1:50.

17. The process of producing an adhesive composition according to claim 12, wherein the hydrocarbon having at least two cyanate groups or the hydrocarbon derivative in the second pack is one or more selected from the group consisting of hexamethylene diisocyanate, tetramethylene diisocyanate, diphenylmethane diisocyanate, and isophorone diisocyanate.

18. A bonding method including:
a step of preparing a liquid mixture by mixing the first and second packs of the adhesive composition according to claim 1 together with a solvent,
a step of applying the liquid mixture to an adherend, and
a step of carrying out heat treatment,
wherein an amount of the second pack is no less than 5% by weight to no greater than 50% by weight relative to a total weight of the first and second packs.

19. The bonding method according to claim 18, wherein the heat treatment is carried out at a temperature of no lower than 23° C. to no higher than 200° C.

20. The bonding method according to claim 18, wherein the heat treatment is carried out for a time period of no less than 15 minutes to no longer than 60 minutes.

* * * * *